United States Patent
Klug et al.

(10) Patent No.: US 10,690,826 B2
(45) Date of Patent: Jun. 23, 2020

(54) VIRTUAL AND AUGMENTED REALITY SYSTEMS AND METHODS

(71) Applicant: Magic Leap, Inc., Dania Beach, FL (US)

(72) Inventors: Michael Anthony Klug, Austin, TX (US); Brian T. Schowengerdt, Seattle, WA (US); Michael Nevin Miller, Austin, TX (US); Vikramjit Singh, Pflugerville, TX (US); Christophe Peroz, San Francisco, CA (US); Pierre St. Hilaire, Belmont, CA (US); Jie Sun, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/182,511

(22) Filed: Jun. 14, 2016

(65) Prior Publication Data

US 2017/0010488 A1  Jan. 12, 2017

Related U.S. Application Data

(60) Provisional application No. 62/175,994, filed on Jun. 15, 2015, provisional application No. 62/180,551, filed on Jun. 16, 2015.

(51) Int. Cl.
 *B05D 1/38* (2006.01)
 *G02B 5/30* (2006.01)
 (Continued)

(52) U.S. Cl.
 CPC .......... *G02B 5/3016* (2013.01); *G02B 1/002* (2013.01); *G02B 5/1809* (2013.01);
 (Continued)

(58) Field of Classification Search
 CPC ...... B05D 1/38; G02F 1/1326; G02B 27/0172
 See application file for complete search history.

(56) References Cited

U.S. PATENT DOCUMENTS

| 4,693,544 A | 9/1987 | Yamasaki et al. |
|---|---|---|
| 5,544,268 A | 8/1996 | Bischel et al. |

(Continued)

FOREIGN PATENT DOCUMENTS

| CN | 101133348 B | 9/2010 |
|---|---|---|
| CN | 102683803 A * | 9/2012 |

(Continued)

OTHER PUBLICATIONS

Yu et al "Flat Optics with Designer Metasurfaces" Nature Materials v13 Feb. 2014 p. 139-150, and available online Jan. 23, 2014 (Year: 2014).*

(Continued)

*Primary Examiner* — Nathan H Empie
(74) *Attorney, Agent, or Firm* — Knobbe, Martens, Olson & Bear, LLP

(57) ABSTRACT

Methods of manufacturing a liquid crystal device including depositing a layer of liquid crystal material on a substrate and imprinting a pattern on the layer of liquid crystal material using an imprint template are disclosed. The liquid crystal material can be jet deposited. The imprint template can include surface relief features, Pancharatnam-Berry Phase Effect (PBPE) structures or diffractive structures. The liquid crystal device manufactured by the methods described herein can be used to manipulate light, such as for beam steering, wavefront shaping, separating wavelengths and/or polarizations, and combining different wavelengths and/or polarizations.

19 Claims, 17 Drawing Sheets

(51) Int. Cl.
*G02B 27/01* (2006.01)
*F21V 8/00* (2006.01)
*G02B 5/18* (2006.01)
*G02B 26/10* (2006.01)
*G02B 27/42* (2006.01)
*G02B 27/00* (2006.01)
*G02B 27/10* (2006.01)
*G02B 1/00* (2006.01)
*G02B 27/28* (2006.01)
*G02F 1/13* (2006.01)

(52) U.S. Cl.
CPC ........... *G02B 5/1833* (2013.01); *G02B 6/004* (2013.01); *G02B 6/0016* (2013.01); *G02B 6/0076* (2013.01); *G02B 26/103* (2013.01); *G02B 27/0081* (2013.01); *G02B 27/0172* (2013.01); *G02B 27/1006* (2013.01); *G02B 27/283* (2013.01); *G02B 27/4272* (2013.01); *G02B 2027/0112* (2013.01); *G02B 2027/0125* (2013.01); *G02B 2027/0185* (2013.01); *G02F 1/1303* (2013.01)

(56) References Cited

U.S. PATENT DOCUMENTS

| | | | |
|---|---|---|---|
| 5,915,051 | A | 6/1999 | Damask et al. |
| 6,181,393 | B1* | 1/2001 | Enomoto .......... G02F 1/133377 349/79 |
| 6,334,960 | B1 | 1/2002 | Willson et al. |
| 6,542,671 | B1 | 4/2003 | Ma et al. |
| 6,690,845 | B1 | 2/2004 | Yoshimura et al. |
| 6,735,224 | B2 | 5/2004 | Murry et al. |
| 6,850,221 | B1 | 2/2005 | Tickle |
| 6,873,087 | B1 | 3/2005 | Choi et al. |
| 6,900,881 | B2 | 5/2005 | Sreenivasan et al. |
| D514,570 | S | 2/2006 | Ohta |
| 7,023,466 | B2 | 4/2006 | Favalora et al. |
| 7,070,405 | B2 | 7/2006 | Sreenivasan et al. |
| 7,098,572 | B2 | 8/2006 | Choi et al. |
| 7,122,482 | B2 | 10/2006 | Xu et al. |
| 7,140,861 | B2 | 11/2006 | Watts et al. |
| 7,519,096 | B2 | 4/2009 | Bouma et al. |
| 7,692,759 | B2 | 4/2010 | Escuti et al. |
| 8,064,035 | B2 | 11/2011 | Escuti et al. |
| 8,076,386 | B2 | 12/2011 | Xu et al. |
| 8,233,204 | B1 | 7/2012 | Robbins et al. |
| 8,248,458 | B2 | 8/2012 | Schowengerdt et al. |
| 8,264,623 | B2 | 9/2012 | Marrucci |
| 8,339,566 | B2 | 12/2012 | Escuti et al. |
| 8,508,848 | B2 | 8/2013 | Saarikko |
| 8,757,812 | B2 | 6/2014 | Melville et al. |
| 8,885,997 | B2 | 11/2014 | Nguyen et al. |
| 8,950,867 | B2 | 2/2015 | Macnamara |
| 9,081,426 | B2 | 7/2015 | Armstrong |
| 9,215,293 | B2 | 12/2015 | Miller |
| D752,529 | S | 3/2016 | Loretan et al. |
| 9,310,559 | B2 | 4/2016 | Macnamara |
| 9,348,143 | B2 | 5/2016 | Gao et al. |
| D758,367 | S | 6/2016 | Natsume |
| D759,657 | S | 7/2016 | Kujawski et al. |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| D794,288 | S | 8/2017 | Beers et al. |
| 9,740,006 | B2 | 8/2017 | Gao |
| 9,791,700 | B2 | 10/2017 | Schowengerdt et al. |
| D805,734 | S | 12/2017 | Fisher et al. |
| 9,851,563 | B2 | 12/2017 | Gao et al. |
| 9,857,591 | B2 | 1/2018 | Welch et al. |
| 10,156,725 | B2 | 12/2018 | TeKolste et al. |
| 10,254,454 | B2 | 4/2019 | Klug et al. |
| 10,261,318 | B2 | 4/2019 | TeKolste et al. |

| | | | |
|---|---|---|---|
| 2002/0097962 | A1 | 7/2002 | Yoshimura et al. |
| 2002/0126249 | A1* | 9/2002 | Liang .................. C09K 19/544 349/187 |
| 2002/0167638 | A1 | 11/2002 | Byun et al. |
| 2002/0172237 | A1 | 11/2002 | Murry et al. |
| 2003/0161573 | A1 | 8/2003 | Ishida |
| 2004/0007465 | A1 | 1/2004 | Goldberg et al. |
| 2004/0022888 | A1 | 2/2004 | Sreenivasan et al. |
| 2004/0120647 | A1 | 6/2004 | Sakata et al. |
| 2004/0191429 | A1 | 9/2004 | Patrick |
| 2005/0042391 | A1* | 2/2005 | Ryan ................... G02B 5/3016 428/1.1 |
| 2005/0072959 | A1* | 4/2005 | Moia ................... G02B 5/3016 252/299.01 |
| 2005/0073577 | A1 | 4/2005 | Sudo et al. |
| 2005/0232530 | A1* | 10/2005 | Kekas ............... G02F 1/133504 385/11 |
| 2005/0270312 | A1* | 12/2005 | Lad ........................... B41J 3/28 347/1 |
| 2006/0121358 | A1 | 6/2006 | Rich et al. |
| 2006/0126179 | A1 | 6/2006 | Levola |
| 2006/0157443 | A1 | 7/2006 | Mei |
| 2007/0031097 | A1 | 2/2007 | Heikenfeld et al. |
| 2008/0043166 | A1* | 2/2008 | Liu ...................... G02F 1/133371 349/56 |
| 2009/0141216 | A1 | 6/2009 | Marrucci |
| 2010/0142570 | A1 | 6/2010 | Konttinen et al. |
| 2010/0207964 | A1 | 8/2010 | Kimmel et al. |
| 2011/0024950 | A1 | 2/2011 | Kruglick |
| 2011/0049761 | A1* | 3/2011 | Mataki .................... B82Y 10/00 264/293 |
| 2012/0127062 | A1 | 5/2012 | Bar-Zeev et al. |
| 2012/0162549 | A1 | 6/2012 | Gao et al. |
| 2012/0206485 | A1 | 8/2012 | Osterhout et al. |
| 2012/0218301 | A1 | 8/2012 | Miller |
| 2012/0327330 | A1 | 12/2012 | Takahashi et al. |
| 2013/0051730 | A1 | 2/2013 | Travers et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0222384 | A1 | 8/2013 | Futterer |
| 2013/0235440 | A1 | 9/2013 | Takeda et al. |
| 2013/0242392 | A1 | 9/2013 | Amirparviz et al. |
| 2013/0314765 | A1 | 11/2013 | Padilla et al. |
| 2013/0314789 | A1 | 11/2013 | Saarikko et al. |
| 2013/0322810 | A1 | 12/2013 | Robbins |
| 2014/0064655 | A1 | 3/2014 | Nguyen et al. |
| 2014/0071539 | A1 | 3/2014 | Gao |
| 2014/0104665 | A1 | 4/2014 | Popovich et al. |
| 2014/0140653 | A1 | 5/2014 | Brown et al. |
| 2014/0140654 | A1 | 5/2014 | Brown et al. |
| 2014/0177023 | A1 | 6/2014 | Gao et al. |
| 2014/0211322 | A1 | 7/2014 | Bohn et al. |
| 2014/0218468 | A1 | 8/2014 | Gao et al. |
| 2014/0233879 | A1 | 8/2014 | Gibson et al. |
| 2014/0300695 | A1 | 10/2014 | Smalley et al. |
| 2014/0306866 | A1 | 10/2014 | Miller et al. |
| 2015/0015879 | A1 | 1/2015 | Papadopoulos et al. |
| 2015/0016777 | A1 | 1/2015 | Abovitz et al. |
| 2015/0062500 | A1 | 3/2015 | Park et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0302652 | A1 | 10/2015 | Miller et al. |
| 2015/0346490 | A1 | 12/2015 | TeKolste et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0033771 | A1 | 2/2016 | Tremblay et al. |
| 2016/0041390 | A1 | 2/2016 | Poon et al. |
| 2016/0055801 | A1 | 2/2016 | Kim et al. |
| 2016/0077338 | A1 | 3/2016 | Robbins et al. |
| 2016/0097930 | A1 | 4/2016 | Robbins et al. |
| 2016/0116739 | A1 | 4/2016 | TeKolste et al. |
| 2016/0116979 | A1 | 4/2016 | Border |
| 2016/0209648 | A1 | 7/2016 | Haddick et al. |

(56) References Cited

U.S. PATENT DOCUMENTS

| | | |
|---|---|---|
| 2016/0270656 A1 | 9/2016 | Samec et al. |
| 2016/0282808 A1 | 9/2016 | Smalley |
| 2017/0010466 A1 | 1/2017 | Klug et al. |
| 2017/0010488 A1 | 1/2017 | Klug et al. |
| 2017/0322419 A1 | 11/2017 | Tekolste et al. |
| 2018/0113310 A1 | 4/2018 | Rolland et al. |
| 2019/0033684 A1 | 1/2019 | Favalora et al. |
| 2019/0121142 A1 | 4/2019 | TeKolste |
| 2019/0227211 A1 | 7/2019 | Klug et al. |
| 2019/0243141 A1 | 8/2019 | TeKolste |
| 2019/0243142 A1 | 8/2019 | TeKolste |

FOREIGN PATENT DOCUMENTS

| | | |
|---|---|---|
| CN | 104145208 | 11/2014 |
| CN | 107111204 | 8/2017 |
| EP | 0 132 077 | 1/1985 |
| EP | 2 065 750 | 6/2009 |
| EP | 2 664 430 | 11/2013 |
| EP | 3 201 686 | 8/2017 |
| EP | 3 308 219 | 4/2018 |
| EP | 3 308 220 | 4/2018 |
| IL | 251433 | 3/2017 |
| JP | 62-269174 | 11/1987 |
| JP | 1991-84516 | 4/1991 |
| JP | 2005-316304 | 11/2005 |
| JP | 2005-316314 | 11/2005 |
| JP | 2010-271565 | 12/2010 |
| KR | 10 2017 00656 | 6/2017 |
| KR | 10-2018-0018766 | 2/2018 |
| KR | 10-2018-0019181 | 2/2018 |
| WO | WO 2005/024469 | 3/2005 |
| WO | WO 2006/092758 | 9/2006 |
| WO | WO 2006/0106501 | 10/2006 |
| WO | WO 2010/067114 | 6/2010 |
| WO | WO 2013/054115 | 4/2013 |
| WO | WO 2014/036537 | 3/2014 |
| WO | WO 2014/091204 | 6/2014 |
| WO | WO 2014/172252 | 10/2014 |
| WO | WO 2015/081313 | 6/2015 |
| WO | WO 2016/054092 | 4/2016 |
| WO | WO 2016/205249 | 12/2016 |
| WO | WO 2016/205256 | 12/2016 |

OTHER PUBLICATIONS

International Search Report and Written Opinion for PCT Application No. PCT/US2016/037452, dated Sep. 1, 2016.
International Search Report and Written Opinion for PCT Application No. PCT/US2016/037443, dated Nov. 3, 2016.
Invitation to Pay Additional Fees for PCT Application No. PCT/US2016/037443, dated Aug. 5, 2016.
International Preliminary Report on Patentability for PCT Application No. PCT/US2015/053016, dated Apr. 13, 2017.
International Search Report and Written Opinion for PCT Application No. PCT/US15/53016, dated Dec. 30, 2015.
"Metamaterials". Duke University. Center for Metamaterials and Integrated Plasmonics. May 11, 2015 (Retrieved from the internet Aug. 12, 2016). URL: http://web.archive.org/web/20150511045547/http://metamaterials.duke.edu/research/metamaterials.
European Office Action for EP Application No. 15847759.6, dated Apr. 20, 2018.
New Zealand Office Action for NZ Application No. 730509, dated Aug. 14, 2017.
New Zealand Office Action for NZ Application No. 730509, dated Mar. 9, 2018.
Taiwanese Office Action for TW Application No. 105118766, dated Feb. 21, 2018.
Escuti M.J. et al., "Polarization-Independent Switching With High Contrast From a Liquid Crystal Polarization Grating," SID Symposium Digest (Jun. 2006) 37:1443-1446.
Escuti M.J. et al., NC State University Slides, "Polarization-Independent LC Microdisplays Using Liquid Crystal Polarization Gratings: A Viable Solution", Presentation at ILCC Jul. 1, 2008 in 15 pages.
Kim, J. et al., "Wide-angle, nonmechanical beam steering with high throughput utilizing polarization gratings", Applied Optics (Jun. 2011) 50(17):2636-2639.
Komanduri R.K. et al., "Elastic Continuum Analysis of the Liquid Crystal Polarization Grating", Physical Review E. (May 25, 2007) in 8 pages.
Komanduri R.K. et al., "Polarization-independent modulation for projection displays using small-period LC polarization gratings", J Soc Inform Display (2007) 15(8):589-594..
Komanduri R.K.et al., "Late-News Paper: Polarization Independent Liquid Crystal Microdisplays", SID Symposium Digest of Tech Papers (May 2008) 39(1):236-239.
Komanduri R.K. et al., NC State University Slides, "Polarization Independent Projection Systems using Thin Film Polymer Polarization Gratings and Standard Liquid Crystal Microdisplays", Presentation at SID-Display Week (Jun. 3, 2009) in 12 pages.
Komanduri R.K. et al., "34.4 L-Late-News Paper: Polarization Independent Projection Systems using Thin Film Polymer Polarization Gratings and Standard Liquid Crystal Microdisplays", In SID Symposium Digest of Technical Papers (Jun. 2009) in 4 pages.
Lim et al., "Anisotropic Nano-Imprinting Technique for Fabricating a Patterned Optical Film of a Liquid Cyrstalline Polymer", J Nanosci Nanotechnol. (2008) 8:4775-4778.
Nikolova et al., "Diffraction Efficiency and Selectivity of Polarization Holographic Recording", Optica Acta: Int'l J Optics (1984) 31(5):579-588.
Oh et al., "Numerical analysis of polarization gratings using the finite-difference time-domain method", Physical Review A (Oct. 2007) 76:043815-1 to -8.
Oh C. et al.: "Achromatic Diffraction from Polarization Gratings with High Efficiency", Opt Lett. (Oct. 2008) 33(20):2287-2289 & Erratum Opt Lett. (Dec. 2009) 34(23):3637.
Oh C. et al., NC State University Slides, "Polarization-Independent Modulation", (2008) in 6 pages.
Oh et al., "Polarization-Independent Modulation Using Standard Liquid Crystal Microdisplays and Polymer Polarization Gratings," NC State University; International Display Research Conference, vol. 28, pp. 298-301, 2008. in 6 pages.
European Extended Search Report for EP Application No. 16812263.8, dated Dec. 7, 2018.
First New Zealand Examination Report, re NZ Application No. 738362, dated Aug. 14, 2018.
First New Zealand Examination Report, re NZ Application No. 738352, dated Jun. 25, 2018.
Taiwanese Office Action for TW Application No. 10620923900, dated Sep. 7, 2017.
European Extended Search Report for EP Application No. 16812261.2, dated Feb. 12, 2019.
Further New Zealand Examination Report, re NZ Application No. 738352, dated Feb. 27, 2019.
Aieta, F. et al. "Multiwavelength achromatic metasurfaces by dispersive phase compensation." Science 347, 1342-1345 (2015).
Arbabi, A. et al. "Dielectric metasurfaces for complete control of phase and polarization with subwavelength spatial resolution and high transmission." Nature Nanotechnology.
Cunningham et al. "A plastic colorimetric resonant optical biosensor for multiparallel detection oflabel-free biochemical interactions", Sensors and Actuators, B, 85, 219-226 (2002).
Escuti J., "Polarization-Independent Modulation & Simplified Spectropolarirnetry Using LC Polarization Gratings," paper #39.4, posters P-209, P-167, SID Symposium Digest, 2006.
Lin,D. et al. "Dielectric gradient metasurface optical elements." Science 345, 298-302 (2014).
Yu, N. et al. "Light propagation with phase discontinuities: generalized laws of reflection and refraction." Science 334, 333-337 (2011).

* cited by examiner

VIRTUAL AND AUGMENTED REALITY SYSTEMS AND METHODS

PRIORITY CLAIM

This application claims the benefit of priority under 35 USC § 119(e) of U.S. Provisional Application No. 62/175,994 filed on Jun. 15, 2015 and of U.S. Provisional Application No. 62/180,551 filed on Jun. 16, 2015. Each of the above-identified applications is incorporated by reference herein in its entirety.

INCORPORATION BY REFERENCE

This application incorporates by reference in its entirety each of the following U.S. Patents and Patent Applications: U.S. Pat. No. 6,334,960, issued on Jan. 1, 2002, titled "Step and Flash Imprint Technology;" U.S. Pat. No. 6,873,087, issued on Mar. 29, 2005, titled "High-Precision Orientation, Alignment and Gap control Stages for Imprint Lithography Processes;" U.S. Pat. No. 6,900,881, issued on May 31, 2005, titled "Step and Repeat Imprint Lithography;" U.S. Pat. No. 7,070,405, issued on Jul. 4, 2006, titled "Alignment Systems for Imprint Lithography;" U.S. Pat. No. 7,122,482, issued on Oct. 17, 2006, titled "Methods for Fabricating Patterned Features Utilizing Imprint Lithography;" U.S. Pat. No. 7,140,861, issued on Nov. 28, 2006, titled "Compliant Hard Template for UV Imprinting;" U.S. Pat. No. 8,076,386, issued on Dec. 13, 2011, titled "Materials for Imprint Lithography;" U.S. Pat. No. 7,098,572, issued on Aug. 29, 2006, titled "Apparatus to Control Displacement of a Body Spaced Apart from a Surface;" U.S. application Ser. No. 14/641,376 filed on Mar. 7, 2015; U.S. application Ser. No. 14/555,585 filed on Nov. 27, 2014; U.S. application Ser. No. 14/690,401 filed on Apr. 18, 2015; U.S. application Ser. No. 14/212,961 filed on Mar. 14, 2014; and U.S. application Ser. No. 14/331,218 filed on Jul. 14, 2014.

BACKGROUND

Field

The present disclosure relates to virtual reality and augmented reality imaging and visualization systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. For example, referring to FIG. 1, an augmented reality scene (1) is depicted wherein a user of an AR technology sees a real-world park-like setting (6) featuring people, trees, buildings in the background, and a concrete platform (1120). In addition to these items, the user of the AR technology also perceives that he "sees" a robot statue (1110) standing upon the real-world platform (1120), and a cartoon-like avatar character (2) flying by which seems to be a personification of a bumble bee, even though these elements (2, 1110) do not exist in the real world. Because the human visual perception system is complex, it is challenging to produce a VR or AR technology that facilitates a comfortable, natural-feeling, rich presentation of virtual image elements amongst other virtual or real-world imagery elements.

Systems and methods disclosed herein address various challenges related to VR and AR technology.

SUMMARY

The systems, methods and devices of the disclosure each have several innovative aspects, no single one of which is solely responsible for the desirable attributes disclosed herein.

In some embodiments, a display system is provided. The display system includes a waveguide; and an image injection device configured to direct a multiplexed light stream into the waveguide. The multiplexed light stream includes a plurality of light streams having different light properties. The waveguide includes in-coupling optical elements configured to selectively in-couple a first of the streams of light while being transmissive to one or more other streams of light. In some embodiments, the waveguide is part of a stack of waveguides, which can include a second waveguide including in-coupling optical elements configured to selectively turn a second of the streams of light while being transmissive to one or more other streams of light. In some embodiments, the in-coupling optical elements of the waveguide are configured to transmit at least one of the streams of light to the in-coupling optical elements of the second waveguide.

Various methods of manufacturing liquid crystal devices including jet depositing liquid crystal material on a substrate and using an imprint pattern to align the molecules of the liquid crystal are described herein. Using the methods described herein, devices including one or several layers of liquid crystal material can be manufactured. Liquid crystal devices manufactured using the methods described herein can include liquid crystal gratings including features and/or patterns that have a size less than about a few microns. Liquid crystal devices manufactured using the methods described herein can also include liquid crystal features and/or patterns that have a size less than the wavelength of visible light and may comprise what are referred to as Pancharatnam-Berry Phase Effect (PBPE) structures, metasurfaces, or metamaterials. In some cases, the small patterned features in these structures can be about 10 nm to about 100 nm wide and about 100 nm to about 1 micron high. In some cases, the small patterned features in these structures can be about 10 nm to about 1 micron wide and about 10 nm to about 1 micron high. Structures for manipulating light, such as for beam steering, wavefront shaping, separating wavelengths and/or polarizations, and combining different wavelengths and/or polarizations can include liquid crystal gratings with metasurface, otherwise referred to herein as metamaterials liquid crystal gratings or liquid crystal gratings with Pancharatnam-Berry Phase Effect (PBPE) structures. Liquid crystal gratings with PBPE structures can combine the high diffraction efficiency and low sensitivity to angle of incidence of liquid crystal gratings with the high wavelength sensitivity of the PBPE structures. Using the various methods of manufacturing described herein, liquid crystal gratings with PBPE structures can be mass-produced which may not be possible using the existing methods of disposing PBPE structures on liquid crystal materials. The methods discussed herein can also be used to fabricate polarizers that are more transparent than existing polarizers.

An innovative aspect of the subject material described herein is included in a method of manufacturing a liquid crystal device. The method comprises depositing a layer of liquid crystal material on a substrate; and imprinting a pattern on the layer of liquid crystal material using an imprint template, such that molecules of the liquid crystal material are self-aligned to the pattern.

Various embodiments of the method can include depositing a layer of material having a refractive index lower than refractive index of the liquid crystal material. The layer of low refractive index material can be configured as a planarization layer using a planarization template. In various embodiments, the imprint template can include at least one of surface relief features, features having a size between about 20 nm and about 1 micron, features having a size between about 10 nm and about 200 nm, PBPE structures, a metasurface, a grating array, curvilinear grooves or curvilinear arcs. Various embodiments of the method the layer of liquid crystal material can be deposited by jet depositing the layer of liquid crystal material. Various embodiments of the method can comprise depositing an additional layer of liquid crystal material over the layer of liquid crystal material. The additional layer of liquid crystal material can be self-aligned to the pattern of the layer of liquid crystal material. In various embodiments of the method a pattern can be imprinted on the additional layer of liquid crystal material. The pattern imprinted on the additional layer of liquid crystal material can be different from the pattern imprinted on the layer of liquid crystal material. The pattern imprinted on the layer of liquid crystal material can be configured to act on a first wavelength, and the pattern imprinted on the additional layer of liquid crystal material can be configured to act on a second wavelength.

Another innovative aspect of the subject material described herein is included in a method of manufacturing a liquid crystal device, the method comprising: depositing a layer of resist on a substrate; imprinting a pattern on the resist layer using an imprint template; and depositing a layer of liquid crystal material on the patterned resist layer such that molecules of the liquid crystal material are self-aligned to the pattern.

In various embodiments of the method depositing a layer of resist can include jet depositing the resist layer. In various embodiments, the imprint template can include at least one of surface relief features, features having a size between about 20 nm and about 1 micron, PBPE structures, features having a size between about 10 nm and about 200 nm, a metasurface, a grating array, curvilinear grooves or curvilinear arcs. Various embodiments of the method the layer of liquid crystal material can be deposited by jet depositing the layer of liquid crystal material. In various embodiments of the method, depositing a layer of liquid crystal material can include jet depositing the layer of liquid crystal material. Various embodiments of the method can further include depositing an additional layer of liquid crystal material over the layer of liquid crystal material. The additional layer of liquid crystal material can be self-aligned to the pattern of the layer of liquid crystal material. A pattern can be imprinted on the additional layer of liquid crystal material. The pattern imprinted on the additional layer of liquid crystal material can be different from the pattern imprinted on the layer of liquid crystal material. The pattern imprinted on the layer of liquid crystal material can be configured to act on a first wavelength, and the pattern imprinted on the additional layer of liquid crystal material is configured to act on a second wavelength.

Yet another innovative aspect of the subject matter disclosed herein includes a method of manufacturing a polarizer, the method comprising: depositing a layer of an optically transmissive material comprising a polymer on a substrate; imprinting a pattern on the polymer layer using an imprint template; and depositing a solution of polarizer material on the patterned polymer layer.

In various embodiments, depositing a solution of polarizer material on the patterned polymer layer can include jet depositing the polarizer material solution on the patterned polymer layer. In various embodiments, depositing a solution of polarizer material on the patterned polymer layer can include spin coating the polarizer material solution on the patterned polymer layer. In various embodiments, the polarizer material can comprise a solution of Iodine and dichroic dye in a solvent. The polarizer can have a transmissivity of at least 47%.

Yet another innovative aspect of the subject matter disclosed herein includes a liquid crystal device comprising a layer of liquid crystal polarization gratings comprising PBPE structures. The liquid crystal device can further comprise another layer of liquid crystal polarization gratings comprising PBPE structures. The liquid crystal device can be configured to selectively in-couple at least one light stream from a multiplexed light stream into the waveguide and transmit one or more other light streams from the multiplexed light stream. The liquid crystal device can be included in a waveguide of a display system. The liquid crystal device and/or the waveguide can be included in an eyepiece of a head mounted display.

Another innovative aspect of the subject matter disclosed herein includes a method of manufacturing an optical device including PBPE structures. The method comprises disposing a layer of a material that can transmit and/or reflect incident light on a substrate and imprinting a pattern including PBPE structures on the material. The material can comprise a liquid crystal. In various embodiments of the method, disposing the material can include jet depositing the material on the substrate. In various embodiments of the method, imprinting a pattern can comprise imprinting a pattern on the material using an imprint template including PBPE structures. The pattern imprinted on the material can be configured to selectively act on one or more wavelengths of light.

Yet another innovative aspect of the subject matter disclosed herein includes a method of manufacturing an optical device including a metasurface, the method comprises disposing a layer of a material that can transmit and/or reflect incident light on a substrate and imprinting a pattern including a metasurface on the material. The material can comprise a liquid crystal. The material can be jet deposited on the substrate. In various embodiments, imprinting a pattern can comprise imprinting a pattern on the material using an imprint template including a metasurface. In various embodiments, the pattern imprinted on the material can be configured to selectively act on one or more wavelengths of light.

Another innovative aspect of the subject matter disclosed herein includes a method of manufacturing a liquid crystal device. The method comprises depositing a layer on a substrate; imprinting a pattern on the layer using an imprint template; and depositing a layer of liquid crystal material on the patterned layer such that molecules of the liquid crystal material are self-aligned to the pattern. The layer can comprise a resist layer. In various embodiments, depositing a layer can include jet depositing the layer. In some embodiments, the imprint template can include at least one of surface relief features, features having a size between about 10 nm and about 200 nm, features having a size between about 20 nm and about 1 micron, PBPE structures, a metasurface, a grating array, curvilinear grooves or arcs.

In various embodiments, depositing a layer of liquid crystal material can include jet depositing the layer of liquid crystal material. In various embodiments, the method can further include depositing an additional layer of liquid crystal material over the layer of liquid crystal material. The additional layer of liquid crystal material can be self-aligned to the pattern of the layer of liquid crystal material. A pattern can be imprinted on the additional layer of liquid crystal material. The pattern imprinted on the additional layer of liquid crystal material can be different from the pattern imprinted on the layer of liquid crystal material. The pattern imprinted on the layer of liquid crystal material can be configured to act on a first wavelength, and the pattern imprinted on the additional layer of liquid crystal material is configured to act on a second wavelength.

Another innovative aspect of the subject matter disclosed herein includes a method of manufacturing a polarizer, the method comprising depositing a layer of an optically transmissive material on a substrate; imprinting a pattern on the material using an imprint template; and depositing a solution of polarizer material on the patterned polymer layer.

Yet another innovative aspect of the subject matter disclosed herein includes a liquid crystal device. The liquid crystal device comprises a substrate; a layer of liquid crystal material have a first surface adjacent the substrate and a second surface opposite the first surface; and a plurality of features on the second surface, the plurality of features having a size between about 10 nm and about 200 nm. In various embodiments, the plurality of features can comprise at least one of PBPE structures, a meta-surface, or a metamaterial. In various embodiments, the plurality of features can be configured as a polarization grating. Embodiments of the liquid crystal device can be included with a waveguide of a display system. The liquid crystal device can be configured to selectively in-couple at least one light stream from a multiplexed light stream into the waveguide and transmit one or more other light streams from the multiplexed light stream. The liquid crystal device can be included in an eyepiece of a head mounted display.

Another innovative aspect of the subject matter disclosed herein includes a liquid crystal device comprising a substrate; a material have a first surface adjacent the substrate and a second surface opposite the first surface, the material comprising a plurality of features on the second surface having a size between about 10 nm and about 200 nm; and a liquid crystal material on the second surface of the material. In various embodiments, the material can comprise a resist. In various embodiments, the plurality of features can comprise a meta-surface and/or a metamaterial. Embodiments of the liquid crystal device can be included with a waveguide of a display system. The liquid crystal device can be configured to selectively in-couple at least one light stream from a multiplexed light stream into the waveguide and transmit one or more other light streams from the multiplexed light stream. The liquid crystal device can be included in an eyepiece of a head mounted display.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Embodiments disclosed herein include optical systems, including display systems, generally. In some embodiments, the display systems are wearable, which may advantageously provide a more immersive VR or AR experience. For example, displays containing a stack of waveguides may be configured to be worn positioned in front of the eyes of a user, or viewer. In some embodiments, two stacks of waveguides, one for each eye of a viewer, may be utilized to provide different images to each eye.

Figure 1:
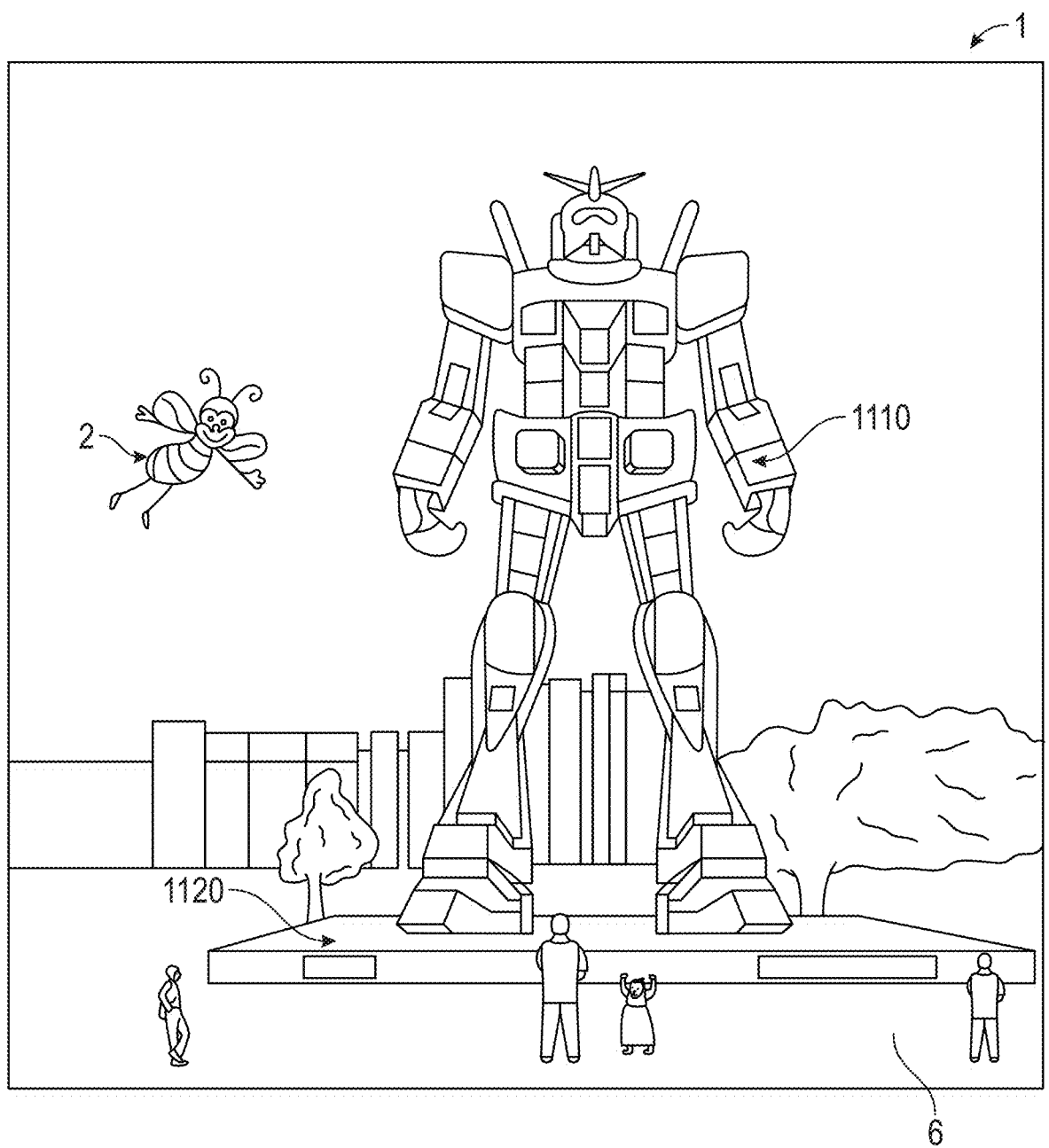
FIG. 1 illustrates a user's view of augmented reality (AR) through an AR device.
Figure 2:
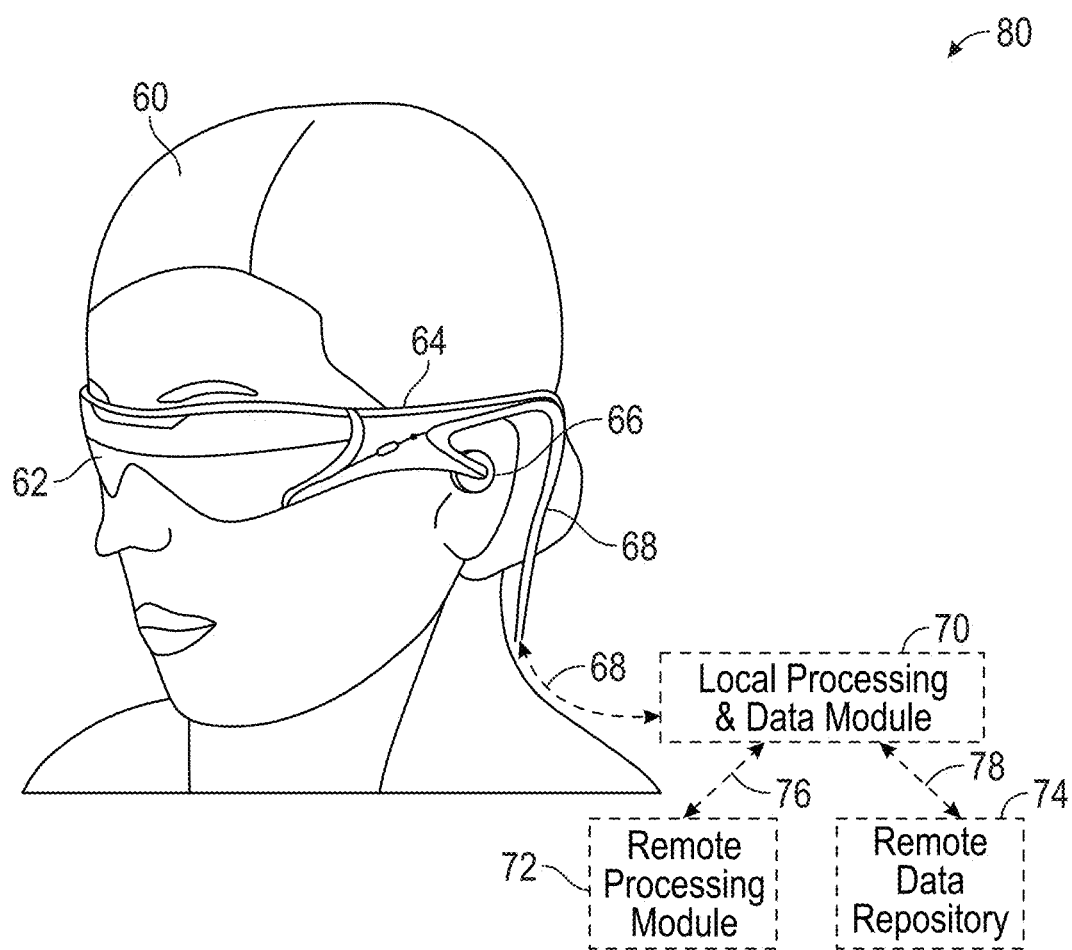
FIG. 2 illustrates an example of wearable display system.

FIG. 2 illustrates an example of wearable display system (80). The display system (80) includes a display (62), and various mechanical and electronic modules and systems to support the functioning of that display (62). The display (62) may be coupled to a frame (64), which is wearable by a display system user or viewer (60) and which is configured to position the display (62) in front of the eyes of the user (60). In some embodiments, a speaker (66) is coupled to the frame (64) and positioned adjacent the ear canal of the user (in some embodiments, another speaker, not shown, is positioned adjacent the other ear canal of the user to provide for stereo/shapeable sound control). The display (62) is operatively coupled (68), such as by a wired lead or wireless connectivity, to a local data processing module (70) which may be mounted in a variety of configurations, such as fixedly attached to the frame (64), fixedly attached to a helmet or hat worn by the user, embedded in headphones, or otherwise removably attached to the user (60) (e.g., in a backpack-style configuration, in a belt-coupling style configuration).

The local processing and data module (70) may comprise a processor, as well as digital memory, such as non-volatile memory (e.g., flash memory), both of which may be utilized to assist in the processing, caching, and storage of data. The data include data a) captured from sensors (which may be, e.g., operatively coupled to the frame (64) or otherwise attached to the user (60)), such as image capture devices (such as cameras), microphones, inertial measurement units, accelerometers, compasses, GPS units, radio devices, and/or gyros; and/or b) acquired and/or processed using remote processing module (72) and/or remote data repository (74), possibly for passage to the display (62) after such processing or retrieval. The local processing and data module (70) may be operatively coupled by communication links (76, 78), such as via a wired or wireless communication links, to the remote processing module (72) and remote data repository (74) such that these remote modules (72, 74) are operatively coupled to each other and available as resources to the local processing and data module (70).

In some embodiments, the remote processing module (72) may comprise one or more processors configured to analyze and process data and/or image information. In some embodiments, the remote data repository (74) may comprise a digital data storage facility, which may be available through the internet or other networking configuration in a "cloud" resource configuration. In some embodiments, all data is stored and all computations are performed in the local processing and data module, allowing fully autonomous use from a remote module.

Figure 3:
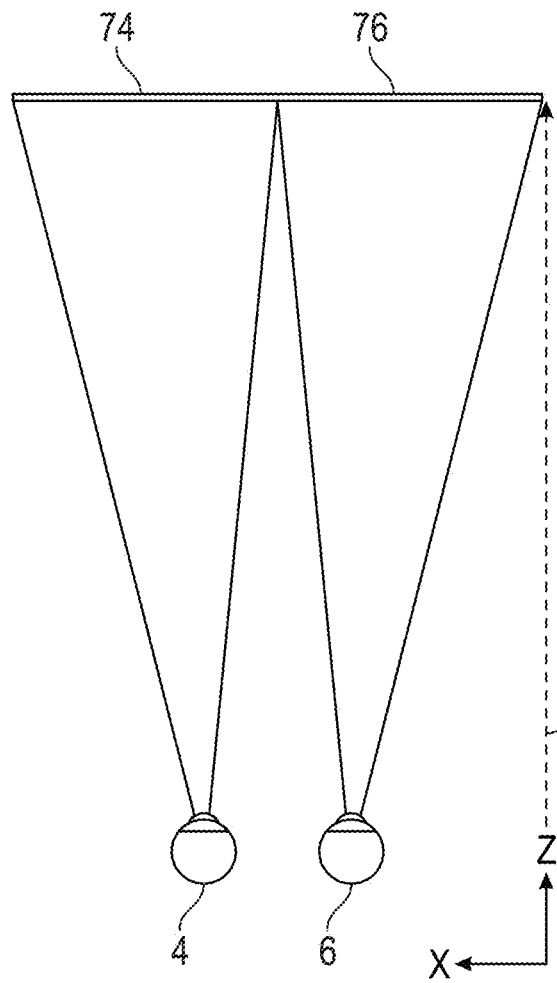
FIG. 3 illustrates a conventional display system for simulating three-dimensional imagery for a user.

The perception of an image as being "three-dimensional" or "3-D" may be achieved by providing slightly different presentations of the image to each eye of the viewer. FIG. 3 illustrates a conventional display system for simulating three-dimensional imagery for a user. Two distinct images 74 and 76, one for each eye 4 and 6, are outputted to the user. The images 74 and 76 are spaced from the eyes 4 and 6 by a distance 10 along an optical or z-axis parallel to the line of sight of the viewer. The images 74 and 76 are flat and the eyes 4 and 6 may focus on the images by assuming a single accommodated state. Such systems rely on the human visual system to combine the images 74 and 76 to provide a perception of depth for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide different presentations of a scene, but with the eyes viewing all the image information at a single accommodated state, and work against the "accommodation-vergence reflex." Display systems that provide a better match between accommodation and vergence may form more realistic and comfortable simulations of three-dimensional imagery.

Figure 4:
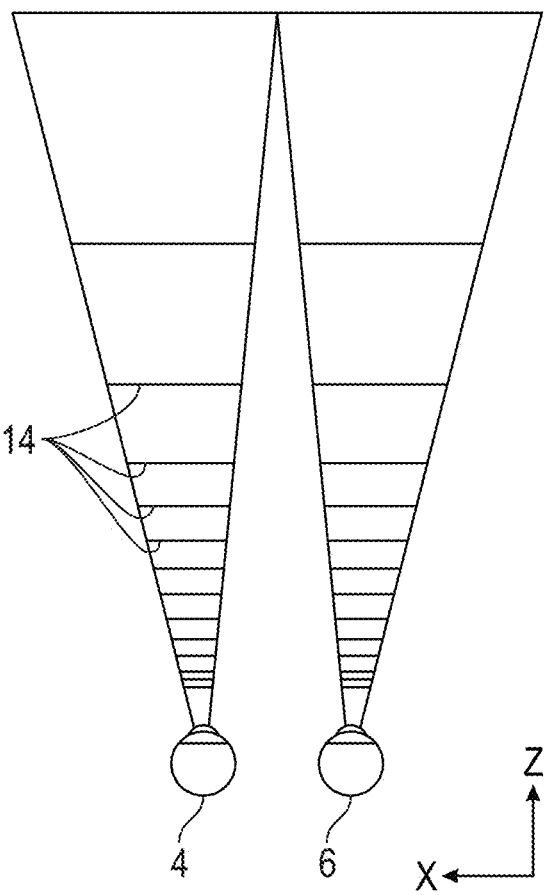
FIG. 4 illustrates aspects of an approach for simulating three-dimensional imagery using multiple depth planes.

FIG. 4 illustrates aspects of an approach for simulating three-dimensional imagery using multiple depth planes. With reference to FIG. 4A, objects at various distances from eyes 4 and 6 on the z-axis are accommodated by the eyes (4, 6) so that those objects are in focus. The eyes 4 and 6 assume particular accommodated states to bring into focus objects at different distances along the z-axis. Consequently, a particular accommodated state may be said to be associated with a particular one of depth planes (14), such that objects or parts of objects in a particular depth plane are in focus when the eye is in the accommodated state for that depth plane. In some embodiments, three-dimensional imagery may be simulated by providing different presentations of an image for each of the eyes (4, 6), and also by providing different presentations of the image corresponding to each of the depth planes.

Figure 5A:
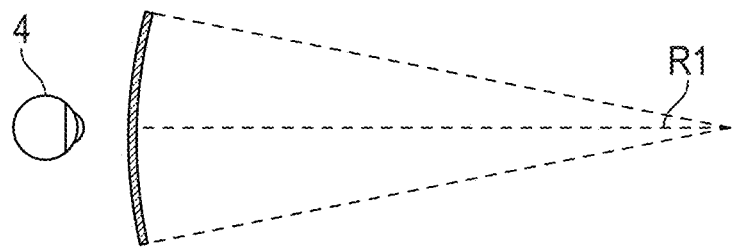
FIGS. 5A-5C illustrate relationships between radius of curvature and focal radius.
Figure 5B:
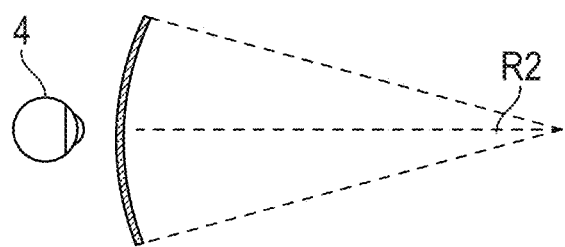
Figure 5C:
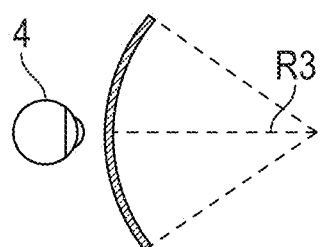

The distance between an object and the eye (4 or 6) can change the amount of divergence of light from that object, as viewed by that eye. FIGS. 5A-5C illustrates relationships between distance and the divergence of light rays. The distance between the object and the eye (4) is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye (4). Consequently, at different depth planes, the degree of divergence of light rays is also different, with the degree of divergence increasing with decreasing distance between depth planes and the viewer's eye 4. While only a single eye (4) is illustrated for clarity of illustration in FIGS. 5A-5C and other figures herein, it will be appreciated that the discussions regarding eye (4) may be applied to both eyes (4 and 6) of a viewer.

Without being limited by theory, it is believed that the human eye typically can interpret a finite of depth planes to provide depth perception. Consequently, a highly believable simulation of perceived depth may be achieved by providing, to the eye, different presentations of an image corresponding to each of these limited number of depth planes.

Figure 6:
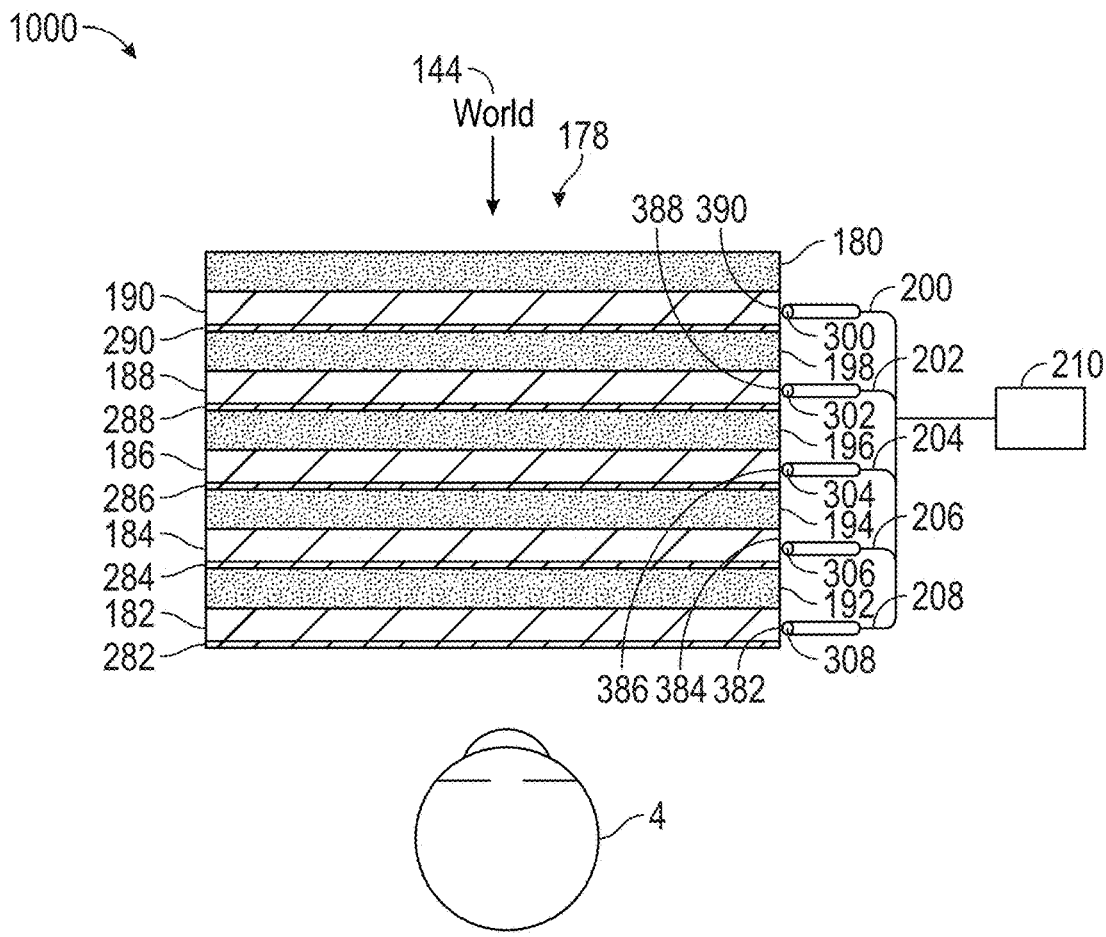
FIG. 6 illustrates an example of a waveguide stack for outputting image information to a user.

FIG. 6 illustrates an example of a waveguide stack for outputting image information to a user. A display system 1000 includes a stack of waveguides, or stacked waveguide assembly, (178) that may be utilized to provide three-dimensional perception to the eye/brain using a plurality of waveguides (182, 184, 186, 188, 190). In some embodiments, the display system (1000) is the system (80) of FIG. 2, with FIG. 6 schematically showing some parts of that system (80) in greater detail. For example, the waveguide assembly (178) may be integrated into the display (62) of FIG. 2.

With continued reference to FIG. 6, the waveguide assembly (178) may also include a plurality of features (198, 196, 194, 192) between the waveguides. In some embodiments, the features (198, 196, 194, 192) may be lens. The waveguides (182, 184, 186, 188, 190) and/or the plurality of lenses (198, 196, 194, 192) may be configured to send image information to the eye with various levels of wavefront curvature or light ray divergence. Each waveguide level may be associated with a particular depth plane and may be configured to output image information corresponding to that depth plane. Image injection devices (200, 202, 204, 206, 208) may be utilized to inject image information into the waveguides (182, 184, 186, 188, 190), each of which may be configured, as described herein, to distribute incoming light across each respective waveguide, for output toward the eye 4. Light exits an output surface (300, 302, 304, 306, 308) of the image injection devices (200, 202, 204, 206, 208) and is injected into a corresponding input edge (382, 384, 386, 388, 390) of the waveguides (182, 184, 186, 188, 190). In some embodiments, a single beam of light (e.g. a collimated beam) may be injected into each waveguide to output an entire field of cloned collimated beams that are directed toward the eye (4) at particular angles (and amounts of divergence) corresponding to the depth plane associated with a particular waveguide.

In some embodiments, the image injection devices (200, 202, 204, 206, 208) are discrete displays that each produce image information for injection into a corresponding waveguide (182, 184, 186, 188, 190, respectively). In some other embodiments, the image injection devices (200, 202, 204, 206, 208) are the output ends of a single multiplexed display which may, e.g., pipe image information via one or more optical conduits (such as fiber optic cables) to each of the image injection devices (200, 202, 204, 206, 208).

A controller 210 controls the operation of the stacked waveguide assembly (178) and the image injection devices (200, 202, 204, 206, 208). In some embodiments, the controller 210 includes programming (e.g., instructions in a non-transitory medium) that regulates the timing and provision of image information to the waveguide (182, 184, 186, 188, 190) according to, e.g., any of the various schemes disclosed herein. In some embodiments, the controller may be a single integral device, or a distributed system connected by wired or wireless communication channels. The controller 210 may be part of the processing modules (70 or 72) (FIG. 2) in some embodiments.

The waveguides (182, 184, 186, 188, 190) may be configured to propagate light within each respective waveguide by total internal reflection (TIR). The waveguides (182, 184, 186, 188, 190) may each be planar, with major top and bottom surfaces and edges extending between those major top and bottom surfaces. In the illustrated configuration, the waveguides (182, 184, 186, 188, 190) may each include light redirecting elements (282, 284, 286, 288, 290) that are configured to redirect light, propagating within each respective waveguide, out of the waveguide to output image information to the eye 4. A beam of light is outputted by the waveguide at locations at which the light propagating in the waveguide strikes a light redirecting element. The light redirecting elements (282, 284, 286, 288, 290) may be reflective and/or diffractive optical features. While illustrated disposed at the bottom major surfaces of the waveguides (182, 184, 186, 188, 190) for ease of description and drawing clarity, in some embodiments, the light redirecting elements (282, 284, 286, 288, 290) may be disposed at the top and/or bottom major surfaces, and/or may be disposed directly in the volume of the waveguides (182, 184, 186, 188, 190). In some embodiments, the light redirecting elements (282, 284, 286, 288, 290) may be formed in a layer of material that is attached to a transparent substrate to form the waveguides (182, 184, 186, 188, 190). In some other embodiments, the waveguides (182, 184, 186, 188, 190) may be a monolithic piece of material and the light redirecting elements (282, 284, 286, 288, 290) may be formed on a surface and/or in the interior of that piece of material.

With continued reference to FIG. 6, as discussed herein, each waveguide (182, 184, 186, 188, 190) is configured to output light to form an image corresponding to a particular depth plane. For example, the waveguide (182) nearest the eye may be configured to deliver collimated light, as injected into such waveguide (182), to the eye (4). The collimated light may be representative of the optical infinity focal plane. The next waveguide up (184) may be configured to send out collimated light which passes through the first lens (192; e.g., a negative lens) before it can reach the eye (4); such first lens (192) may be configured to create a slight convex wavefront curvature so that the eye/brain interprets light coming from that next waveguide up (184) as coming from a first focal plane closer inward toward the eye (4) from optical infinity. Similarly, the third up waveguide (186) passes its output light through both the first (192) and second (194) lenses before reaching the eye (4); the combined optical power of the first (192) and second (194) lenses may be configured to create another incremental amount of wavefront curvature so that the eye/brain interprets light coming from the third waveguide (186) as coming from a second focal plane that is even closer inward toward the person from optical infinity than was light from the next waveguide up (184).

The other waveguide layers (188, 190) and lenses (196, 198) are similarly configured, with the highest waveguide (190) in the stack sending its output through all of the lenses between it and the eye for an aggregate focal power representative of the closest focal plane to the person. To compensate for the stack of lenses (198, 196, 194, 192) when viewing/interpreting light coming from the world (144) on the other side of the stacked waveguide assembly (178), a compensating lens layer (180) may be disposed at the top of the stack to compensate for the aggregate power of the lens stack (198, 196, 194, 192) below. Such a configuration provides as many perceived focal planes as there are available waveguide/lens pairings. Both the light redirecting elements of the waveguides and the focusing aspects of the lenses may be static (i.e., not dynamic or electro-active). In some alternative embodiments, they may be dynamic using electro-active features.

With continued reference to FIG. 6, the light redirecting elements (282, 284, 286, 288, 290) may be configured to both redirect light out of their respective waveguides and to output this light with the appropriate amount of divergence or collimation for a particular depth plane associated with the waveguide. As a result, waveguides having different associated depth planes may have different configurations of light redirecting elements (282, 284, 286, 288, 290), which output light with a different amount of divergence depending on the associated depth plane. In some embodiments, as discussed herein, the light redirecting elements (282, 284, 286, 288, 290) may be volumetric or surface features, which may be configured to output light at specific angles. For example, the light redirecting elements (282, 284, 286, 288, 290) may be volume holograms, surface holograms, and/or diffraction gratings. Light redirecting elements, such as diffraction gratings, are described in U.S. patent application Ser. No. 14/641,376, filed Mar. 7, 2015, which is incorporated by reference herein in its entirety. In some embodiments, the features (198, 196, 194, 192) may not be lenses; rather, they may simply be spacers (e.g., cladding layers and/or structures for forming air gaps).

In some embodiments, the light redirecting elements (282, 284, 286, 288, 290) are diffractive features that form a diffraction pattern, or "diffractive optical element" (also referred to herein as a "DOE"). Preferably, the DOE's have a relatively low diffraction efficiency so that only a portion of the light of the beam is deflected away toward the eye (4) with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye (4) for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

Figure 7:
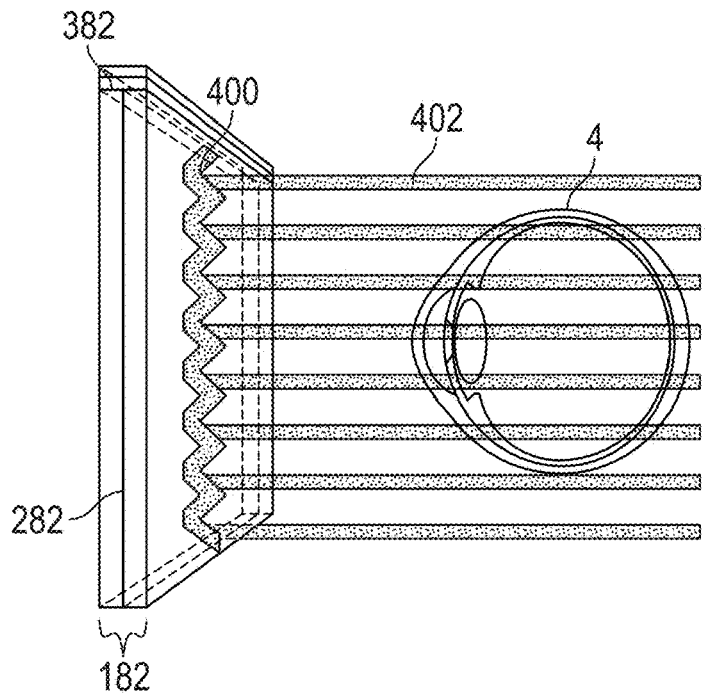
FIG. 7 shows an example of exit beams outputted by a waveguide.

FIG. 7 shows an example of exit beams outputted by a waveguide. One waveguide is illustrated, but it will be appreciated that other waveguides in the stack of waveguides (178) may function similarly. Light (400) is injected into the waveguide (182) at the input edge (382) of the waveguide (182) and propagates within the waveguide (182) by TIR. At points where the light (400) impinges on the DOE (282), a portion of the light exits the waveguide as exit beams (402). The exit beams (402) are illustrated as substantially parallel but, as discussed herein, they may also be redirected to propagate to the eye (4) at an angle (e.g., forming divergent exit beans), depending on the depth plane associated with the waveguide (182). It will be appreciated that substantially parallel exit beams may be indicative of a waveguide that corresponds to a depth plane at a large distance (e.g., optical infinity) from the eye (4). Other waveguides may output an exit beam pattern that is more divergent, which would require the eye (4) to accommodate to a closer distance to bring it into focus on the retina and would be interpreted by the brain as light from a distance closer to the eye (4) than optical infinity.

Part I. Multiplexed Image Information

With reference again to FIG. 6, utilizing a dedicated image injection device (200, 202, 204, 206, or 208) for each waveguide (182, 184, 186, 188, or 190) may be mechanically complex and may require a large volume to accommodate all of the image injection devices and their related connections. A smaller form factor may be desirable for some applications, such as wearable displays.

In some embodiments, a smaller form factor may be achieved by using a single image injection device to inject information into a plurality of the waveguides. The image injection device delivers multiple image information streams (also referred to herein as information streams) to the waveguides, and these information streams may be considered to be multiplexed. Each waveguide includes in-coupling optical elements that interact with the information streams to selectively in-couple image information from a particular information stream into that waveguide. In some embodiments, the in-coupling optical elements selectively redirect light from a particular information stream into its associated waveguide, while allowing light for other information streams to continue to propagate to other waveguides. The redirected light is redirected at angles such that it propagates through its associated waveguide by TIR. Thus, in some embodiments, a single image injection device provides a multiplexed information stream to a plurality of waveguides, and each waveguide of that plurality of waveguides has an associated information stream that it selectively in-couples using in-coupling optical elements.

The selective interaction between the in-coupling optical elements and the information streams may be facilitated by utilizing information streams with different optical properties. For example, each information stream may be formed by light of different colors (different wavelengths) and/or different polarizations (preferably different circular polarizations). In turn, the in-coupling optical elements are configured to selectively redirect light of a particular polarization and/or of one or more particular wavelengths, thereby allowing a specific correspondence, e.g., one-to-one correspondence, between an information stream and a waveguide. In some embodiments, the in-coupling optical elements are diffractive optical elements configured to selectively redirect light based upon the properties of that light, e.g., the wavelength and/or polarization of that light.

In some embodiments, each image injection device provides image information to a plurality of two, three, four, or more waveguides by providing, respectively, two, three, four, or more information streams to that plurality of waveguides. In some embodiments, multiple such image injection devices may be used to provide information to each of multiple pluralities of waveguides.

Figure 8A:
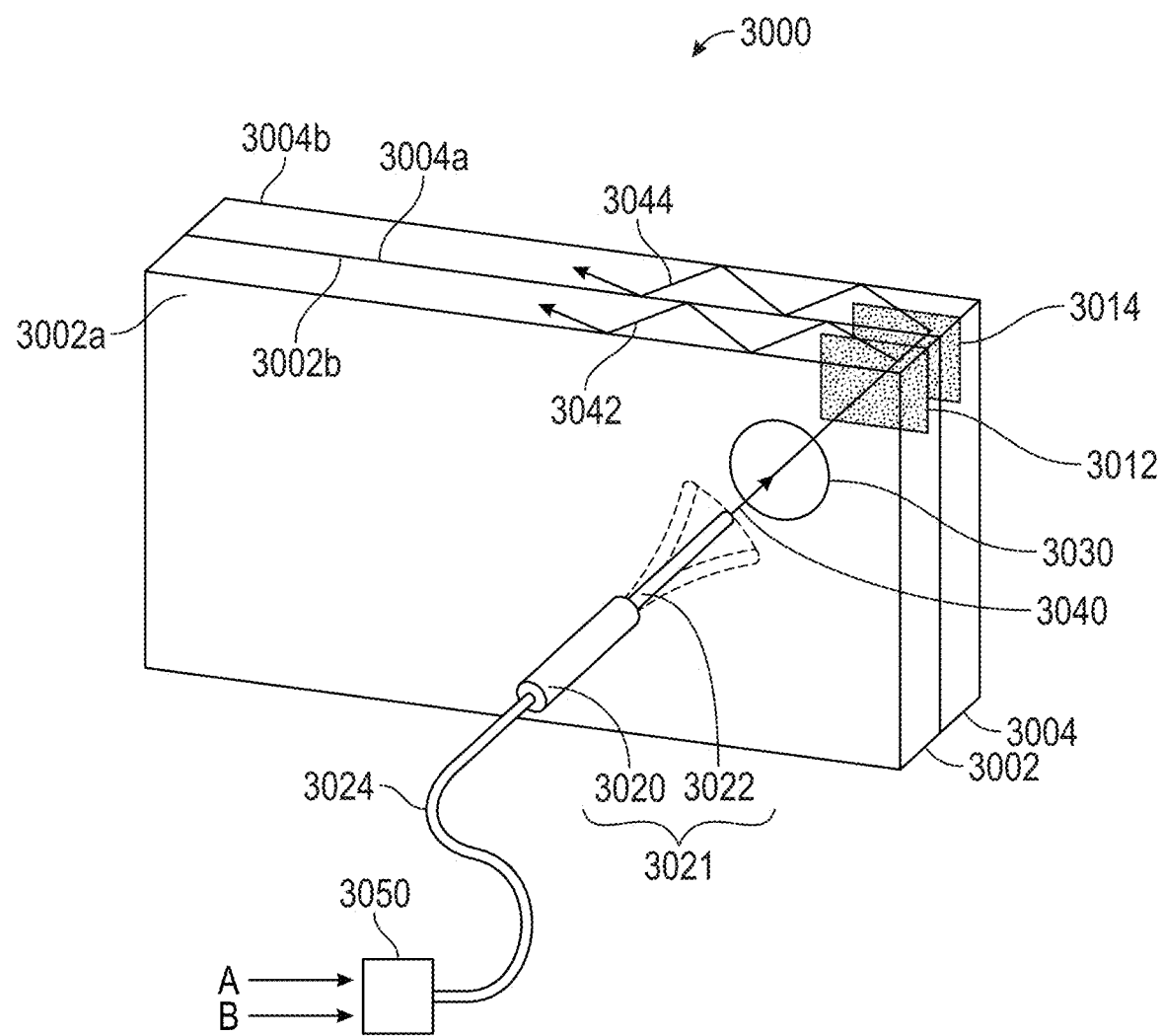
FIG. 8A schematically illustrates a perspective view of an example of the delivery of multiplexed image information into one or more waveguides.

With reference now to FIG. 8A, an example of the delivery of multiplexed image information into one or more waveguides is illustrated schematically in a perspective view. A stack 3000 includes waveguides 3002 and 3004, which include in-coupling optical elements 3012 and 3014, respectively. In some embodiments, the waveguides 3002 and 3004 may be substantially planar plates, each having a front and rear major surface and edges extending between these front and rear major surfaces. For example, waveguide 3002 has front major surface 3002a and rear major surface 3002b. The major surfaces of the waveguides may include a cladding layer (not illustrated) to facilitate the TIR of light within each waveguide. In some embodiments, the stack 3000 of waveguides corresponds to the stack 178 of FIG. 6 and may be utilized to replace the stack 178 in the display systems disclosed herein.

With continued reference to FIG. 8A, light streams A and B have different light properties, e.g., different wavelengths and/or different polarizations (preferably different circular polarizations). The light streams A and B include distinct image information streams. Light A and B and their information streams are propagated through optical conduit 3024 (e.g., an optical fiber) as a multiplexed information stream to an image injection device 3021. The image injection device injects light 3040 (containing the multiplexed information stream as combined light streams A and B) into the waveguide stack 3000.

In some embodiments, the image injection device 3021 includes an actuator 3020 (such as a piezoelectric actuator) that is coupled to an optical fiber 352, which may be used to scan the fiber tip of the fiber 352 across an area of the stack 3000. Examples of such scanning fiber image injection devices are disclosed in U.S. patent application Ser. No. 14/641,376, filed Mar. 7, 2015, which is incorporated by reference herein in its entirety. In some other embodiments, the image injection device 3021 may be stationary and, in some embodiments, may direct light towards the stack 3000 from multiple angles.

In some embodiments, each waveguide includes in-coupling optical elements. For example, waveguide 3002 includes in-coupling optical elements 3012, and waveguide 3004 includes in-coupling optical elements 3014. The in-coupling optical elements 3012 and 3014 are configured to selectively redirect one of light streams A and B. For example, in-coupling optical elements 3012 may selectively redirect at least a portion of light stream A to in-couple that light stream into the light guide 3002. The in-coupled portion of light stream A propagates through the waveguide 3002 as light 3042. In some embodiments, the light 3042 propagates through the waveguide 3002 by TIR off the major surfaces 3002a and 3002b of that waveguide. Similarly, in-coupling optical elements 3014 may selectively redirect at least a portion of light stream B to in-couple that light stream into the light guide 3004. The in-coupled portion of light stream B propagates through the waveguide 3004 as light 3044. In some embodiments, the light 3044 propagates through the waveguide 3004 by TIR off the major surfaces 3004a and 3004b of that waveguide.

As illustrated, in some embodiments, the multiplexed light stream 3040 includes both light streams A and B simultaneously, and light stream A may be in-coupled to waveguide 3002 while light stream B is in-coupled to waveguide 3004, as discuss above. In some other embodiments, light streams A and B may be provided to the waveguide stack 3000 at different times. In such embodiments, only a single waveguide may be utilized to receive these information streams, as discussed herein. In either case, the light streams A and B may be coupled to the optical conduit 3024 by the optical coupler 3050. In some embodiments, the optical coupler 3050 may combine light streams A and B for propagation through the optical conduit 3024.

With continued reference to FIG. 8A, in some embodiments, optics 3030 may be disposed between the image injection device 3021 and the in-coupling optical elements 3012 and 3014. The optics 3030 may include, e.g., lens that facilitating directing light rays onto the various in-coupling optical elements 3012 and 3014, e.g., by focusing the light onto in-coupling optical elements 3012 and 3014. In some embodiments, the optics are part of the image injection device 3021 and may be, e.g., a lens at the end of the image injection device 3021. In some embodiments, optics 3030 may be omitted completely.

It will be appreciated that the in-coupling optical elements 3012 and 3014 are configured to selectively redirect the light streams A and B based upon one or more light properties that differ between those light streams. For example, light stream A may have a different wavelength than light stream B and the in-coupling optical elements 3012 and 3014 may be configured to selectively redirect light based on wavelength. Preferably, the different wavelengths correspond to different colors, which can improve the selectivity of the in-coupling optical elements relative to using different wavelengths of the same color.

In some embodiments, light stream A may have a different polarization than light stream B and the in-coupling optical elements 3012 and 3014 may be configured to selectively redirect light based on polarization. For example, the in-coupling optical elements 3012 and 3014 may be configured to selectively redirect light based on polarization. In some embodiments, the light streams A and B have different circular polarization. In some embodiments, the light streams A and B may have multiple differences in light properties, including, e.g., both different wavelengths and different polarizations.

In some embodiments, in-coupling optical elements 3012 and 3014 are diffractive optical elements, including diffractive gratings (e.g., a grating comprising liquid crystal such as a liquid crystal polarization grating). In some embodiments, the optical element may include a meta-surface (e.g., comprise a PBPE), such as a surface have a pattern with feature sizes on the order of one's or ten's of nanometers. Examples of suitable in-coupling optical elements 3012 and 3014 include the optical elements 2000b, 2000d (FIG. 9A) and the optical elements of FIGS. 9E-9H. Advantageously, such optical elements are highly efficient at selectively redirecting light of different polarizations and/or different wavelengths.

Figure 8B:
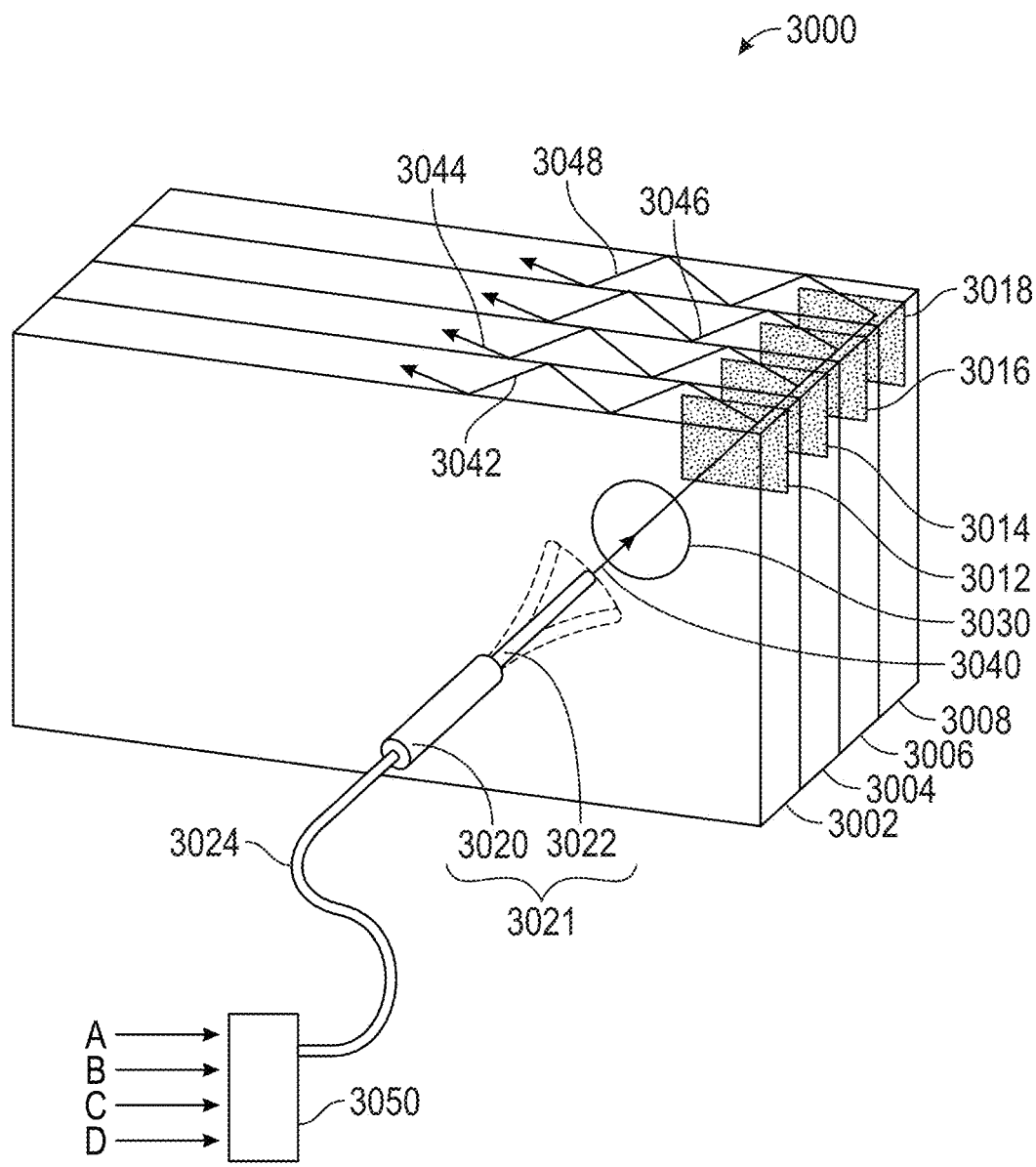
FIG. 8B schematically illustrates a perspective view of another example of the delivery of multiplexed image information into multiple waveguides.

With reference now to FIG. 8B, another example of the delivery of multiplexed image information into multiple waveguides is illustrated schematically in a perspective view. It will be appreciated that the stack 3000 can include more than two waveguides, e.g., 4, 6, 8, 10, 12, or other numbers of waveguides, so long as image information can be adequately provided to individual waveguides and to a user's eyes through the stack 3000. The illustrated stack 3000 includes waveguides 3006 and 3008 in addition to the waveguides 3002 and 3004. The waveguides 3006 and 3008 include in-coupling optical elements 3012 and 3014, respectively. In some embodiments, the waveguides 3002, 3004, 3006, and 3008 may be similar, except for the in-coupling optical elements, which may each be configured to redirect and in-couple light having different light properties. In some other embodiments, in-coupling optical elements for multiple waveguides may be similar. It will be appreciated that all the disclosure herein related to FIG. 8A apply to FIG. 8B, except that the number of waveguides in FIG. 8B is greater than in FIG. 8A.

With continued reference to FIG. 8B, light streams A, B, C, and D have different light properties, e.g., different wavelengths and/or different polarizations (preferably different circular polarizations). For example, light streams A, B, C, and D may each include light of different wavelengths. In some other embodiments, various combinations of different wavelengths and polarizations are possible. For example, A and B may have similar wavelengths and different polarizations, and C and D may have similar wavelengths and different polarizations, with A and B different from C and D. Light streams A, B, C, and D are propagated through optical conduit 3024 as a multiplexed information stream to the image injection device 3021, which injects light 3040 of the multiplexed information stream into the waveguide stack 3000. As discussed herein, the multiplexed information stream may include all light streams simultaneously, or one or more of the light streams may be directed to the stack 3000 at different times.

In some embodiments, each waveguide includes in-coupling optical elements that selectively in-couple light into that waveguide. For example, waveguide 3002 includes in-coupling optical elements 3012, which may be configured to in-couple light stream A into that waveguide, so that it propagates by TIR in that waveguide as light 3042; waveguide 3004 includes in-coupling optical elements 3014, which may be configured to in-couple light stream B into that waveguide, so that it propagates by TIR in that waveguide as light 3044; waveguide 3006 includes in-coupling optical elements 3016, which may be configured to in-couple light stream C into that waveguide, so that it propagates by TIR in that waveguide as light 3046; and waveguide 3008 includes in-coupling optical elements 3018, which may be configured to in-couple light stream D into that waveguide, so that it propagates by TIR in that waveguide as light 3048.

It will be appreciated that, in some embodiments, a single light stream (e.g., light stream A, B, C, or D) may be in-coupled to a single waveguide. In some other embodiments, multiple light streams may be in-coupled to the same waveguide. Preferably, in such an arrangement, the light streams are in-coupled at different times. In some embodiments, such temporally separated in-coupling may be achieved using in-coupling optical elements that selectively turn light based on multiple different light properties (e.g., multiple different wavelengths or multiple different polarizations), while the image injection device provides the information streams for a particular waveguide at different times. For example, both light streams A and B may be in-coupled to waveguide 3002, with the in-coupling optical elements 3012 selectively in-coupling light streams A and B while allowing light streams C and D to pass through, and with the light streams A and B providing light to the in-coupling optical elements 3012 at different times while simultaneously providing light streams C and/or D to the in-coupling optical elements 3012. It will be appreciated that one or more other waveguides may be similarly configured to in-couple multiple light streams to those waveguides.

In some other embodiments, multiple light streams (e.g., light streams A and B) may be provided simultaneously to the in-coupling optical elements (e.g., in-coupling optical elements 3012), and the in-coupling optical elements may be configured to change states to choose between in-coupling light stream A or B. For example, in some embodiments, the in-coupling optical elements may be a grating formed of liquid crystal material disposed between electrodes (e.g., transparent electrodes such as ITO). The liquid crystal may change states (e.g., orientations) with the application of a voltage potential, with one state configured to selectively in-couple one light stream (e.g., light stream A) and another state configured to be transparent to all light streams (e.g., both light stream A and B). In some embodiments, another layer of switchable liquid crystal material, forming a different grating, may be provided between electrodes, with one state configured to selectively in-couple a different light stream (e.g., light stream B) and another state configured to be transparent to all light streams (e.g., both light stream A and B). In some other embodiments, both types of liquid crystal material may be disposed on the same level, but in different areas. The liquid crystal material may be configured such that when one type of material is transparent to the light streams, the other type selectively in-couples light of a particular light stream, and vice versa.

Figure 8C:
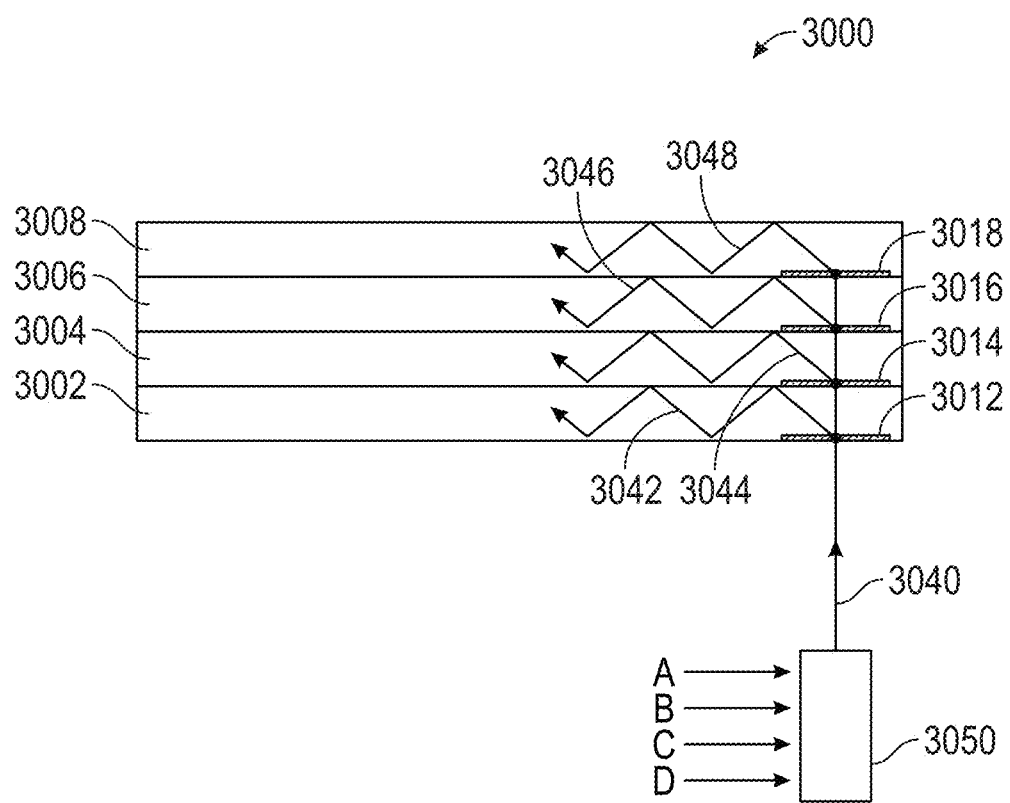
FIG. 8C schematically illustrates a top-down view of the display system of FIG. 8B.

Now with reference to FIG. 8C, a top-down schematic view of the display system of FIG. 8B is illustrated. The top-down view is taken looking down along a top edge of the stack 3000 of FIG. 8B. As illustrated, in some embodiments, portions of multiplexed light stream 3040 are selectively in-coupled into each of waveguides 3002, 3004, 3006, and 3008 as in-coupled light 3042, 3044, 3046, and 3048.

Figure 8D:
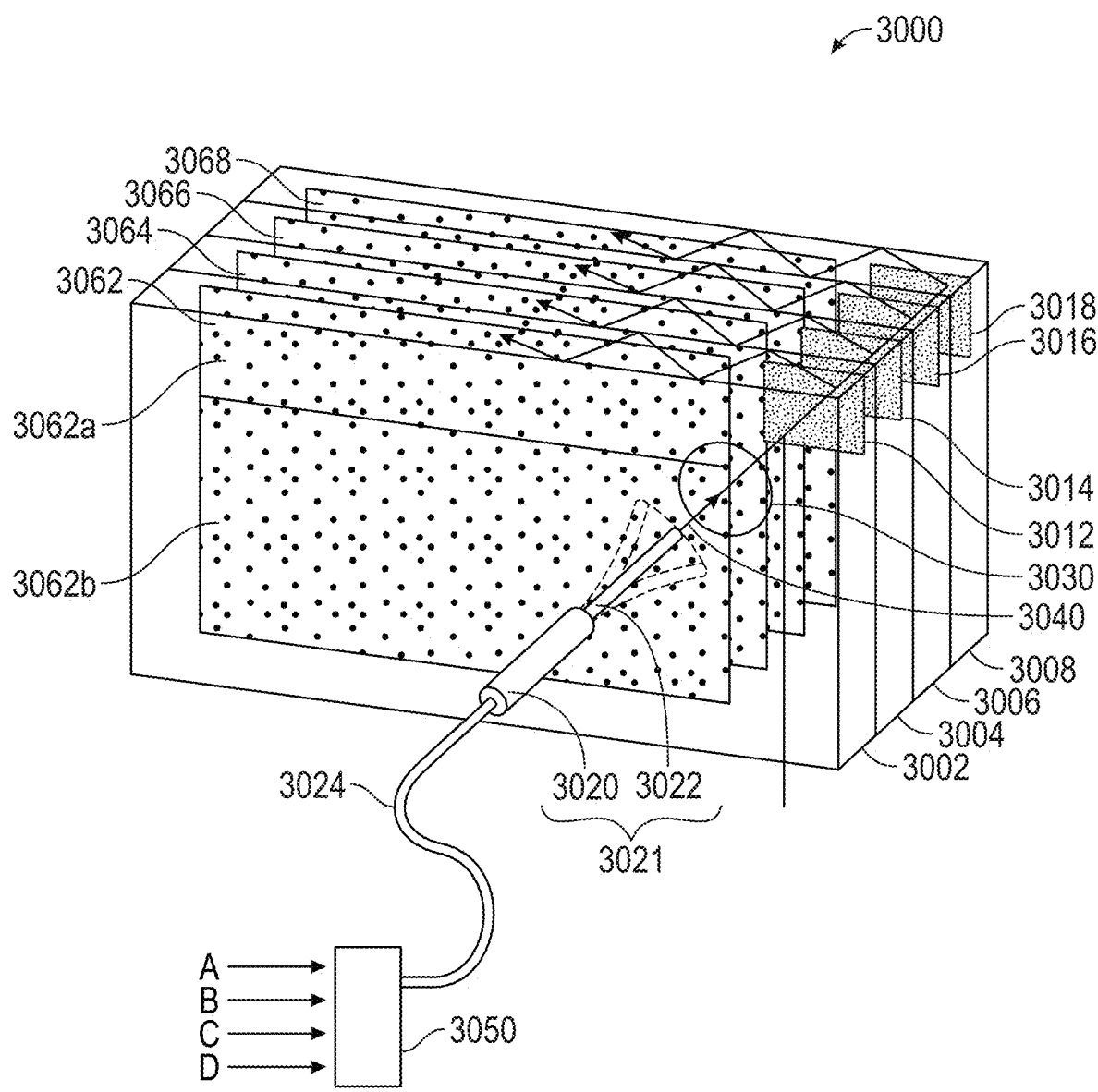
FIG. 8D illustrates the display system of FIG. 8C, with light redirecting elements to out-couple light from each waveguide.

As discussed herein, the waveguides may include light redirecting elements (e.g., light redirecting elements (282, 284, 286, 288, 290)) that output or out-couple light, which has been propagating inside the waveguide, so that the out-coupled light propagates towards the eyes 4 of a viewer (FIG. 6). FIG. 8D illustrates the display system of FIG. 8C, with light redirecting elements to out-couple light from each waveguide. For example, waveguide 3002 includes out-coupling light redirecting elements 3062, waveguide 3004 includes out-coupling light redirecting elements 3064, waveguide 3006 includes out-coupling light redirecting elements 3066, and waveguide 3008 includes out-coupling light redirecting elements 3068. In some embodiments, the out-coupling light redirecting elements may include different groups of light redirecting elements, each of which functions differently. For example, out-coupling light redirecting elements 3062 may include a first group of light redirecting elements 3062a and a second group of light redirecting elements 3062b. For example, light redirecting elements 3062b may be exit pupil expanders (EPEs; to increase the dimensions of the eye box in at least one axis), and light redirecting elements 3062a may be orthogonal pupil expanders (OPEs; to increase the eye box in an axis crossing, e.g., orthogonal to, the axis of the EPEs). EPEs and OPEs are disclosed in U.S. Provisional Patent Application No. 62/005,807, filed May 30, 2014, the entire disclosure of which is incorporated by reference herein.

It will be appreciated that images are formed by the waveguides using information streams with encoded x-y pixel information. For example, the information streams of different colors may each indicate the intensity of light for a particular location on an x-y grid corresponding to the x-y pixel information for the image. Without being limited by theory, it will also be appreciated that the matching of information streams to waveguides is achieved using the properties of light and is not necessarily dependent upon the x-y pixel information provided by that light. Consequently, the x-y pixel information may be encoded at any suitable location using any suitable device along the path of the light before the light impinges on the in-coupling optical elements 3012, 3014, 3016, and 3018.

Figure 8E:
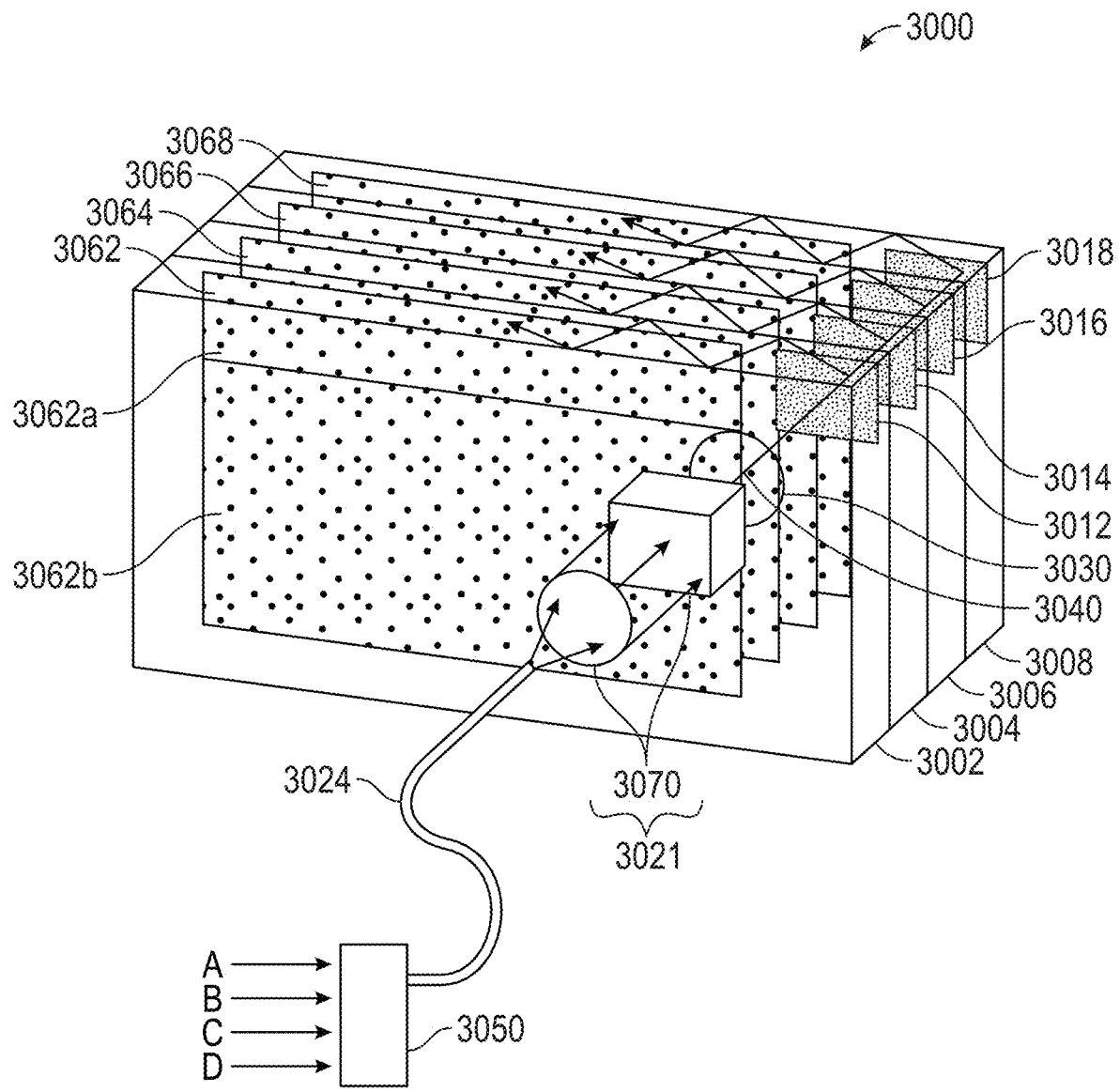
FIG. 8E illustrates the display system of FIG. 8B including an image injection device comprising a light modulation device for providing x-y pixel information.

In some embodiments, if a light source (e.g., LED or OLED) is pixilated and is able to output light having the desired light properties (e.g., desired wavelengths and/or polarizations), then an information stream may be formed having both the desired light properties and encoded x-y pixel information as it is emitted from the light source. In some other embodiments, light having the desired light properties is passed through a light modulation device in which the x-y pixel information is encoded. FIG. 8E illustrates the display system of FIG. 8B and shows a light modulation device 3070 for providing x-y pixel information to the image information stream. In some embodiments, the light modulation device 3070 may be part of the image injection device 3021, and may be configured to provide image information using a scanning fiber, or one or more stationary aperture display devices for providing image information to the waveguides. In some embodiments, the light modulation device 3070 modifies the light as it passes through the device (e.g., the intensity of the light may be modified by being passed through pixel elements having controllable variable light transmission). In some other embodiments, the light modulation device may modify light by selectively redirecting (e.g., reflecting) light to propagate into the waveguide stack 3000. Examples of light modulation devices include transmissive liquid crystal displays and micro-mirror devices (such as a "digital light processing", or "DLP" system, such as those available from Texas Instruments, Inc.).

Part II. Liquid Crystal Polarization Gratings with Pancharatnam-Berry Phase Effect (PBPE) Structures This section relates to liquid crystals, polarization gratings, and Pancharatnam-Berry Phase Effect (PBPE) structures, methods of fabrication thereof as well as other structures and methods. In some embodiments, methods and apparatus are provided for manufacturing liquid crystal grating structures that have high diffraction efficiency, low sensitivity to angle of incident and high wavelength sensitivity. Various methods described herein include disposing a layer of liquid crystal material using inkjet technology and using an imprint template to align the liquid crystal material.

In some embodiments, the liquid crystals, polarization gratings, and Pancharatnam-Berry Phase Effect (PBPE) structures disclosed in this Part II may be utilized to form light redirecting elements for the various waveguides of the waveguide stacks 178 (FIG. 6) or 3000 (FIGS. 8A-8E). For example, such liquid crystals, polarization gratings, and Pancharatnam-Berry Phase Effect (PBPE) structures may advantageously be applied to form the various in-coupling optical elements disclosed herein, including the in-coupling optical elements 3012, 3014, 3016, and/or 3018 (FIG. 8A-8E).

A variety of imaging systems and optical signal processing systems can include liquid crystal devices to control/manipulate an optical wavefront, wavelength, polarization, phase, intensity, angle and/or other properties of light. Liquid crystals are partly ordered materials whose molecules are often shaped like rods or plates or some other forms that can be aligned along a certain direction. The direction along which the molecules of the liquid crystal are oriented can be manipulated by application of electromagnetic forces which can be used to control/manipulate the properties of light incident on the liquid crystal material.

Methods of manufacturing liquid crystal devices and certain resulting structures are described herein.

The following detailed description is directed to certain embodiments for the purposes of describing the innovative aspects. However, the teachings herein can be applied in a multitude of different ways. As will be apparent from the following description, the innovative aspects may be implemented in any optical component or device that is configured to manipulate one or more characteristics of incident light.

As discussed more fully below, innovative aspects described herein include fabricating liquid crystal devices using jet deposition technology. For example, in an embodiment of a method of manufacturing a liquid crystal device, a layer of liquid crystal material is deposited on a substrate using jet deposition technology (e.g., inkjet technology). Surface relief features (e.g., PBPE structures) can be imprinted in the layer of the jet deposited liquid crystal material using a template. The surface relief features may be configured (e.g., with particular spacing and/or heights) to achieve particular light redirecting properties. In some other embodiments, imprinting can be repeated on different levels to produce successive layered cross-sections that, in combination, can behave as volumetric features (such as exists in "bulk" volume-phase materials and devices. In various embodiments, these surface relief features (and the successive layered cross-sections) can be modeled as "Bragg" structures. Generally, such structures can be used to produce binary surface-relief features in which there exists a material-to-air interface, resist-to-air interface, resin-to-air interface or a liquid crystal material-to-air interface that produces diffraction, or a material-to-lower index resist interface, resist-to-lower index resist interface, resin-to-lower index resist interface or a liquid crystal material-to-lower index resist interface that does the same. In these cases the gratings can be modeled as "raman-nath" structures, rather than Bragg structures. The molecules of the liquid crystal material are aligned through the process of imprinting due to the physical shape of the nanostructures and their electrostatic interaction with the liquid crystal (LC) material. Alignment of the liquid crystal layer using the imprint pattern is discussed in greater detail below.

In various embodiments, a layer of material, (e.g., a polymer), to serve as a photo-alignment layer, may be deposited using jet deposition technology (in which a jet or stream of material is directed onto a substrate), e.g., via ink-jet onto a substrate or pre-coated substrate. The photo-alignment layer is patterned by nano-imprinting using a template incorporating the desired LC orientation pattern. In some embodiments, this pattern is a PBPE pattern, and the template, comprising a physical relief, may be made with interferometric and/or lithographic techniques. The template is lowered on to the soft polymer resin and UV light is used to cure the resin to a fixed state. In some embodiments, capillary action fills the template with the polymer material before it is cured. The template is retracted, leaving the patterned, cured resin in place on the substrate. A second step, using a deposition process (e.g., jet or spin coating) applies a layer of LC (e.g., LC suspended in resin) on top of the photo-alignment layer. The LC aligns to the photo-alignment layer pattern below it, and when this occurs, the resin is fixed in place using UV light, heat, or a combination of both. In some other embodiments, LC suspended in solvent (e.g., resin) is deposited (e.g., dispensed using jet or spin coating), and the template containing the nanoimprint pattern (e.g., a PBPE pattern) is lowered into contact with the LC material. to the LC takes up the relief profile of the template (e.g., by capillary action into the openings in the template), and the LC material is fixed in place using a cure process (e.g., UV, heat or a combination of both). The resulting structure may be used directly as a functional element, or in some cases, a low refractive index material can be deposited over the imprinted liquid crystal material to fill the interstitial areas between the surface features imprinted in the liquid crystal material.

The low refractive index material can be configured as a planarization layer by tuning the viscoelastic and chemical properties of the liquid crystals based resist or by contacting the top surface of the low refractive index material with a planarization imprint template (e.g., a template having a substantially planar surface). In some other embodiments, the low refractive index material can be planarized by a chemical and/or mechanical planarization process. The planarization process is preferably chosen to form a planarized surface that is smooth, to reduce optical artifacts that may be caused by a rough surface. Additional layers such as additional liquid crystal layers can be deposited using the jet technology over the liquid crystal layer. The PBPE structures in the different layers of liquid crystal can be configured to diffract, steer, and/or disperse or combine different wavelengths of light. For example, red, green and blue wavelengths can be diffracted, dispersed, or redirected along different directions by the PBPE structures in the different liquid crystal layers.

The different liquid crystal layers are preferably formed with materials that provide sufficient structural stability and adhesion to allow layers to be stacked over one another. In some embodiments, organic or inorganic imprint resist materials, including polymerizable materials that form optically transmissive cured structures, may be used. As an example, the liquid crystal layers can include an acrylic liquid crystal formulation. Acrylic liquid crystal layers can provide adhesive properties that facilitate the stacking of layers on top of each other.

It will be appreciated that, as discussed herein both the liquid crystal material and the low refractive index material may be flowable materials. In some embodiments, these materials may be subjected to a process to immobilize them after contact with the imprint templates and before removing the contacting template. The immobilization process may include a curing process, as discussed herein.

As another example, in another embodiment of a method of manufacturing a liquid crystal device, a layer of a photoresist material (e.g., a resin or a polymer) is deposited on a substrate. The deposition may be accomplished by various deposition methods, including spin coating. More preferably, in some embodiments, the deposition is accomplished using jet technology (e.g., inkjet technology). The photoresist is imprinted with an imprint template or mold having surface relief features (e.g., PBPE structures). A layer of liquid crystal material can be deposited using jet technology on the imprinted layer of photoresist. The imprinted photoresist layer can serve as an aligning layer to align the molecules of the liquid crystal material as it is deposited. Additional layers such as additional liquid crystal layers or layers not comprising liquid crystal can be deposited using the jet technology over the liquid crystal layer. In various embodiments, a planarization layer can be deposited over the deposited liquid crystal layer.

In embodiments discussed herein, different types of liquid crystal materials, such as, for example, doped liquid crystal, un-doped liquid crystal, and other non-liquid crystal materials can be deposited using inkjet technology. Inkjet technology can provide thin controlled (e.g., uniform) thickness of the deposited liquid crystal layer or planarization layer. Inkjet technology can also provide layers of different thickness such as layers of liquid crystal or other layers having a different thickness in different areas on the surface and can accommodate different pattern height and keep a constant residual layer thickness underneath the imprinted patterns. Inkjet technology is advantageously capable of providing thin layers, for example between about 10 nm and 1 micron; or between about 10 nm and about 10 microns in thickness and can reduce waste in comparison with other techniques such as spin coating. The inkjet technology can facilitate deposition of different liquid crystal compositions on the same substrate. In addition, inkjet nano-imprinting can produce a very thin residual layer thickness. In the illustrated embodiments, the uniform area below the imprint pattern can correspond to the residual layer. PBPE and other diffractive structures can exhibit variable and sometimes enhanced performance with very thin or zero residual layer thickness. Inkjet nano-imprinting approaches can be used to deposit different types of materials across a given substrate simultaneously, and can be used to produce variable thickness materials in different areas of a single substrate simultaneously. This may be beneficial to PBPE structures, particularly when they are combined in a single substrate with more conventional diffractive structures which may require other materials and/or thicknesses of resist.

The liquid crystal layers deposited by jet technology can be cured using UV curing, thermal methods, freezing, annealing and other methods. The imprint template can include complex groove geometries (e.g., grooves with multiple steps, gratings with different orientations, etc.). Liquid crystal devices manufactured using the methods described herein can include liquid crystal layers comprising gratings with different orientations and different PBPE structures.

The manufacturing methods using inkjet technology described herein can also be configured to manufacture polarizers having increased transmissivity and/or wave plates comprising subwavelength features and/or metamaterials. These and other aspects are discussed in detail below.

Figure 9A:
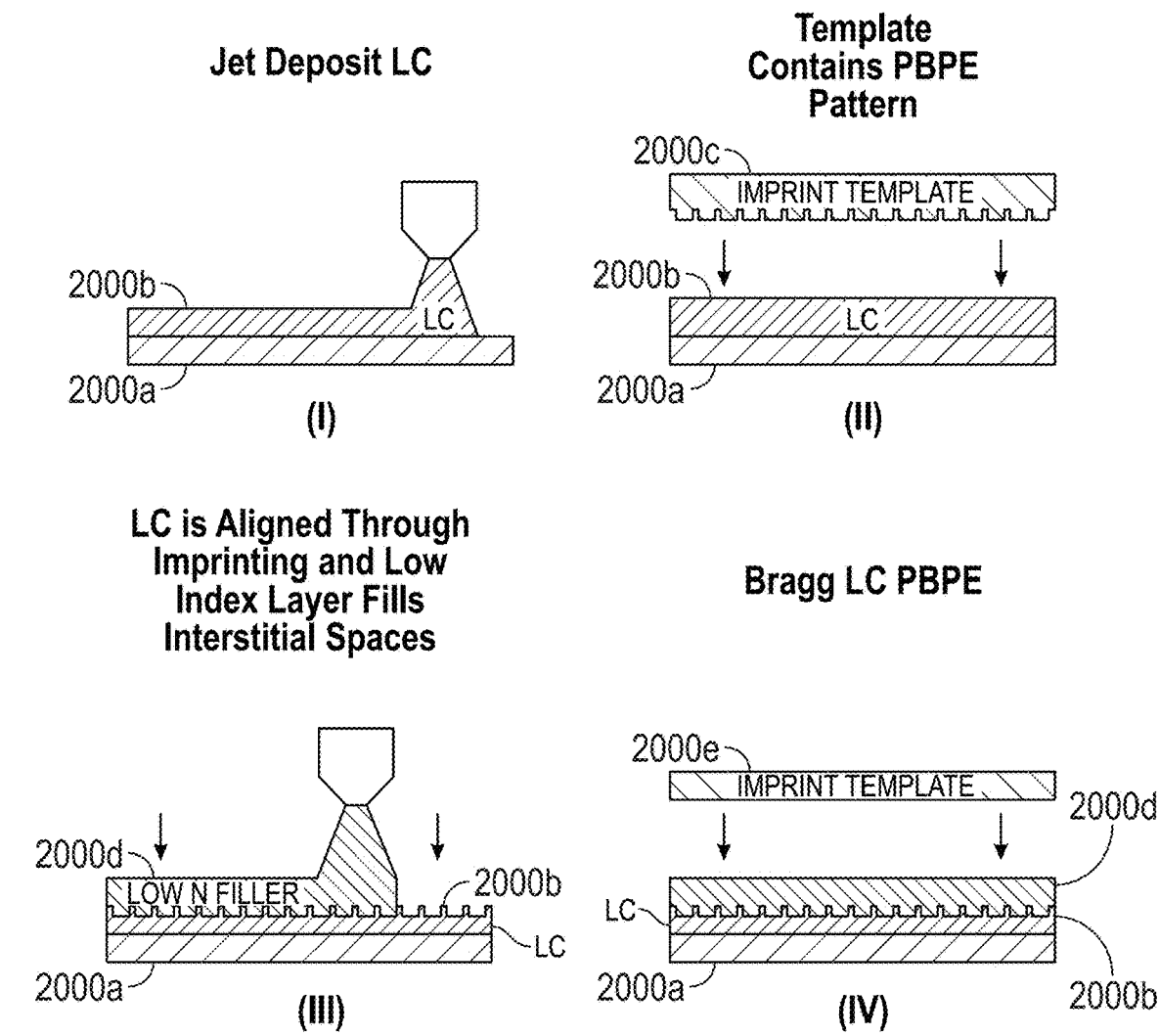
FIG. 9A illustrates an embodiment of a method of fabricating a liquid crystal device.

FIG. 9A illustrates an embodiment of a method of fabricating a liquid crystal device, preferably using inkjet technology. In the embodiment of the method illustrated in FIG. 9A, a layer 2000b of liquid crystal material is deposited on a substrate 2000a, e.g., using inkjet technology, as shown in panel (i). The liquid crystal material can include a doped or an un-doped liquid crystal material. In various embodiments, the liquid crystal material can be a polymer stabilized nematic liquid crystal material. The substrate 2000a can include glass, plastic, sapphire, a polymer or any other substrate material. The layer 2000b of the liquid crystal material can have a thickness between about 20 nanometers and 2 microns. In some embodiments, the layer 2000b of the liquid crystal material can have a thickness between about 0.5 microns and about 10 microns.

The layer 2000b of the liquid crystal material can be imprinted with an imprint pattern 2000c including wavelength and sub-wavelength scale surface features, as shown in panel (ii). The surface features can include PBPE structures that can directly manipulate the phase of the incoming light. Without any loss of generality, a PBPE structure can be thought of as a type of polarization grating structure. In various embodiments, the imprint pattern 2000c can include an array of grooves comprising PBPE structures. The array of grooves can form a liquid crystal grating structure that can have high diffraction efficiency and low sensitivity to incident angle. The grooves can have a depth between about 20 nm and about 1 micron and a width between about 20 nm and about 1 micron. In some embodiments, the grooves can have a depth between about 100 nm and about 500 nm and a width between about 200 nm and about 5000 nm. In some embodiments, the grooves can have a depth between about 20 nm and about 500 nm and a width between about 10 nm and about 10 micron. The PBPE structures can include sub-wavelength patterns that encode phase profile directly onto the local orientation of the optical axis. The PBPE structures can be disposed on the surface of the liquid crystal grating structures. The PBPE structures can have feature sizes between about 20 nm and about 1 micron. In some embodiments, the PBPE structures can have feature sizes between about 10 nm and about 200 nm. In some embodiments, the PBPE structures can have feature sizes between about 10 nm and about 800 nm. In various embodiments, an underlying PBPE structure can be used as an alignment layer for volumetric orientation of LC. The volumetric component in this case happens automatically, as the LCs naturally align themselves to the alignment layer. In another embodiment, it may be desirable to differentially align multiple layers containing PBPE alignment and LC layers, to change diffraction properties of the system as a composite—for example to multiplex multiple wavelength operation since each sub-layer would act on only a select subset of wavelengths.

Figure 9B:
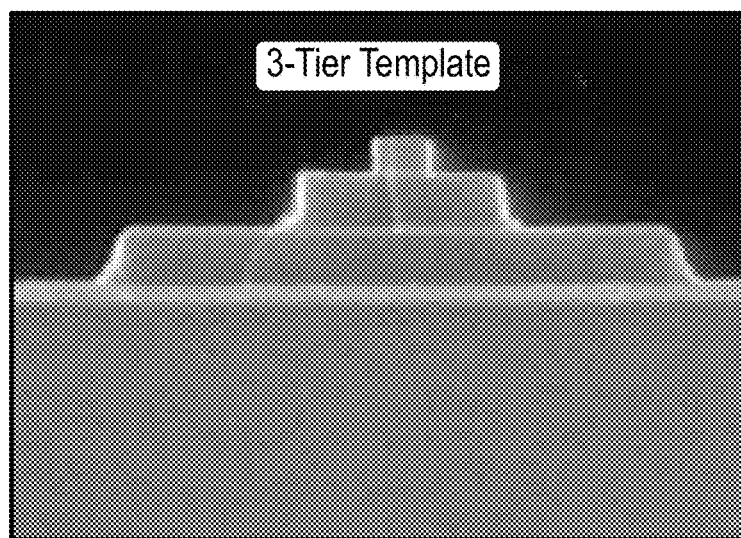
FIGS. 9B and 9C illustrate embodiments of imprint templates that can be used to fabricate liquid crystal devices in accordance with the method described in FIG. 9A above or FIG. 9D below.
Figure 9C:
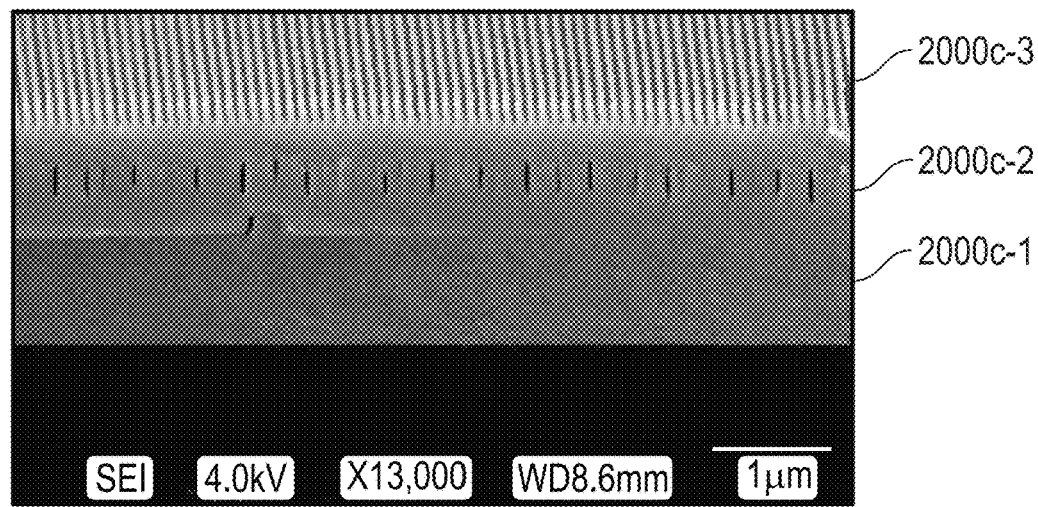

In various embodiments, the imprint pattern 2000c can include a simple geometric pattern, such as, for example, a plurality of grooves or more complicated pattern such as multi-tier geometry including a plurality of grooves and recesses as shown in FIG. 9B. In various embodiments, the imprint pattern 2000c can include a plurality of imprint layers, each imprint layer including a different imprint pattern as shown in FIG. 9C. In the imprint pattern shown in FIG. 9C, the imprint layers 2000c-1, 2000c-2 and 2000c-3 include a plurality of grooves with progressively decreasing space between adjacent grooves. In various embodiments, the imprint pattern can include patterns such as chevron, spirals, arcs, etc. The imprint pattern can be fabricated on a semiconductor material or other structure using methods such as e-beam lithography or other lithography methods.

Referring to FIG. 9A, the layer 2000b of the liquid crystal material is aligned to the imprinted pattern. The spaces between adjacent grooves can be filled with a material 2000d. In some embodiments, filling material may comprise a transparent material having a lower refractive index less than the refractive index of the liquid crystal material, as shown in panel (iii). Such a configuration can be used, for example, in a waveguide structure. In this manner a high refractive index difference can be obtained between the liquid crystal grating structures and its surrounding such that the liquid crystal gratings can have high diffraction efficiency. As mentioned above, the PBPE LC grating may be made material-to-air interface, a resist-to-air interface, resin-to-air interface or liquid crystal material-to-air interface, where air is the low index "material". However, in some cases it may be desirable to place another layer of material on top of the prior patterned layer, possibly in intimate contact, and in this case it may be desirable to dispense and planarize a low-index curable resin that preserves the differential index of refraction between PBPE structures, but that also provide a laminate-able layer above. In various embodiments, the liquid crystal gratings can be configured as Bragg liquid crystal gratings. In various embodiments, the layer of low refractive index material 2000d can be configured as a planarization layer. In such embodiments, the layer of low refractive index material 2000d can be configured to be planarized by another imprint pattern 2000e, as shown in panel (iv).

Figure 9D:
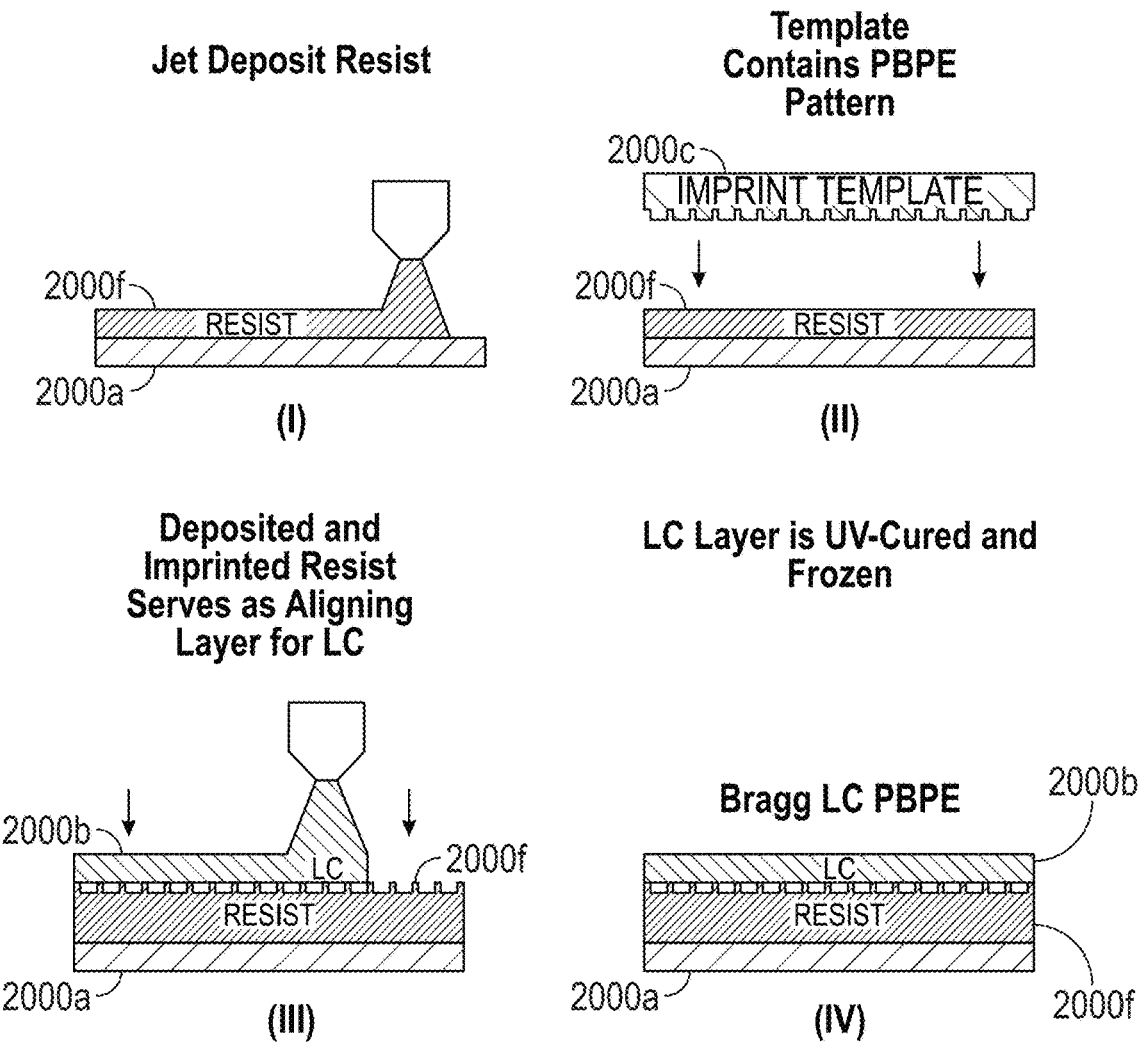
FIG. 9D illustrates another embodiment of a method of fabricating a liquid crystal device.

FIG. 9D illustrates another embodiment of a method of fabricating a liquid crystal device, preferably using inkjet technology. In the embodiment of the method illustrated in FIG. 9A, a layer 2000f of a resist is deposited on a substrate 2000a using inkjet technology, as shown in panel (i). The resist can include materials such as, for example, organic and inorganic based imprint materials, resins or polymers. For example, the resist can include materials disclosed in U.S. Pat. No. 8,076,386 which is incorporated by reference herein in its entirety. In some embodiments, the resist layer 9F can have a thickness between about 20 nm and about 1 micron. In some embodiments, the resist layer 9F can have a thickness between about 10 nm and about 5 micron. The resist layer 2000f can be imprinted with an imprint pattern 2000c including volume and/or surface features, as shown in panel (ii). A layer 2000b of liquid crystal material can be disposed by inkjet on the imprinted resist layer 2000f, as shown in panel (iii). The imprinted resist layer can serve to align the liquid crystal material as it is jet deposited onto the imprinted resist layer 2000f.

The liquid crystal devices fabricated using above described methods can be cured using UV curing, thermal curing, freezing or other curing methods.

Another embodiment of a method to fabricate liquid crystal devices includes imprinting a desired alignment structure in UV curable resist using Jet and Flash™Imprint Lithography (J-FIL); and dispensing a liquid crystal polymer formulation from inkjet. The liquid crystal polymer can have a high solvent content, for example, to provide sufficiently low viscosity to enable efficient egress through the inkjets. In various embodiments, the liquid crystal polymer can be in an isotropic state as it is dispensed. In some embodiments, the liquid crystal polymer can be configured to align along the alignment structure in the resist by driving off the solvent. Additional liquid crystal polymer layers can be disposed on top of the disposed liquid crystal polymer layer by following the method described above. The formulation and the viscosity of the liquid crystal material in the solvent may also be adjusted to achieve rapid drying process for the dispensed liquid crystal materials.

Figure 9E:
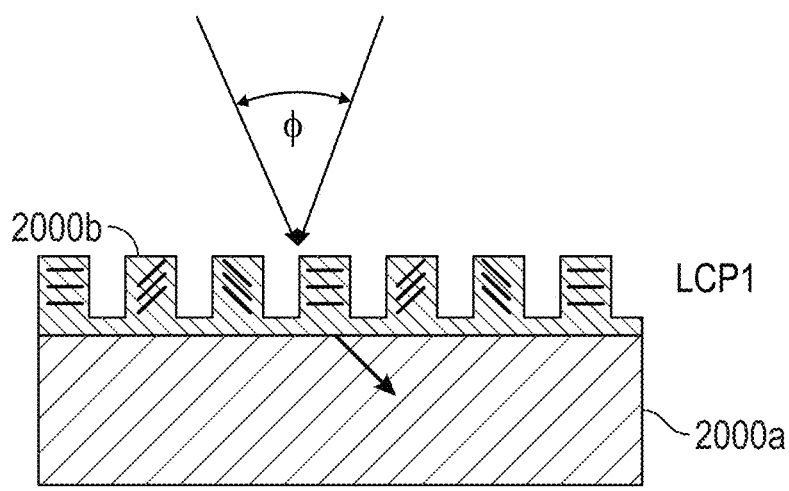
FIG. 9E, FIG. 9F, FIG. 9G and FIG. 9H illustrate various embodiments of liquid crystal devices that can be manufactured using the methods described in FIG. 9A or 9D.
Figure 9F:
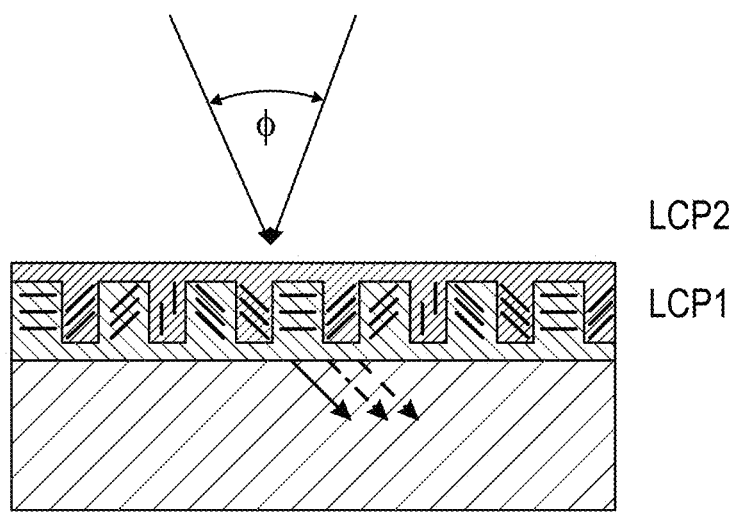

FIGS. 9E-9H illustrate embodiments of liquid crystal gratings fabricated using the methods described above. FIG. 9E illustrates a single layer liquid crystal grating including PBPE structures that have high diffraction efficiency, high wavelength sensitivity and low sensitivity to incident angle. The liquid crystal gratings illustrated in FIG. 9E can be manufactured using the process depicted in FIG. 9A. For example, a liquid crystal polymer LCP1 can be deposited on a substrate and an imprint template can be used to imprint a pattern on the liquid crystal polymer LCP1 such that the molecules of the liquid crystal polymer LCP1 are self-aligned to the imprinted pattern. The pattern can include a metasurface (e.g., PBPE structures). FIG. 9F illustrates a liquid crystal grating including PBPE structures that have high diffraction efficiency, high wavelength sensitivity and low sensitivity to incident angle. In the embodiment illustrated in FIG. 9F, the liquid crystal gratings can be manufactured using the process depicted in FIG. 9D. For example, an alignment layer comprising a polymer (e.g., a resist or a resin) can be deposited on a substrate and an imprint template can be used to imprint a pattern on the polymer. A layer of liquid crystal material is deposited on the alignment layer such that the molecules of the liquid crystal layer are aligned to the pattern imprinted on the alignment layer. The pattern can be part of a metasurface (e.g., PBPE structures). In various embodiments, PBPE structure of the first liquid crystal layer (LCP1) can serve as the alignment structure for the second liquid layer (LCP2).

Figure 9G:
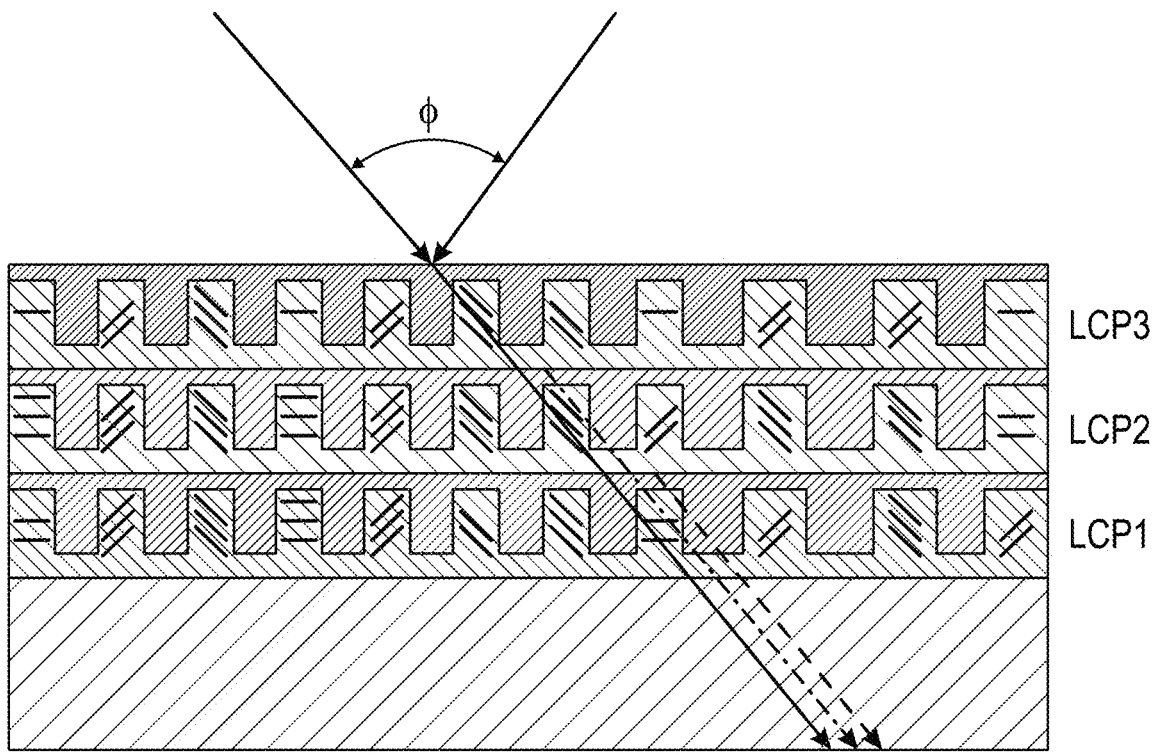

FIG. 9G illustrates a three layer liquid crystal grating including PBPE structures that have high diffraction efficiency, high wavelength sensitivity and low sensitivity to incident angle. The multi-layer liquid crystal gratings can be manufactured using the processes depicted in FIG. 9A or 9D. For example, using the process of FIG. 9D, the multi-layer liquid crystal gratings illustrated in FIG. 9G can be manufactured by aligning the molecules of a first liquid crystal layer (LCP1) using a first alignment layer comprising a first imprint pattern deposited on the substrate, aligning the molecules of a second liquid crystal layer (LCP2) using a second alignment layer comprising a second imprint pattern deposited on the first alignment layer and aligning the molecules of a third liquid crystal layer (LCP3) using a third alignment layer comprising a third imprint pattern deposited on the second alignment layer. In some embodiments, the process of FIG. 9A may be utilized to form one or more of the first, second, and third liquid crystal layers have aligned liquid crystal molecules (LCP1, LCP2, and LCP3, respectively). In such embodiments, each of LCP1, LCP2, and LCP3 may be formed by imprinting a pattern in a liquid crystal layer deposited over the substrate. The imprinting may be accomplished using an imprint template having a pattern that causes the liquid crystal molecules to align to the pattern. The imprint template may subsequently be removed and a filler may be deposited into the gaps left by the imprint template removal.

Figure 9H:
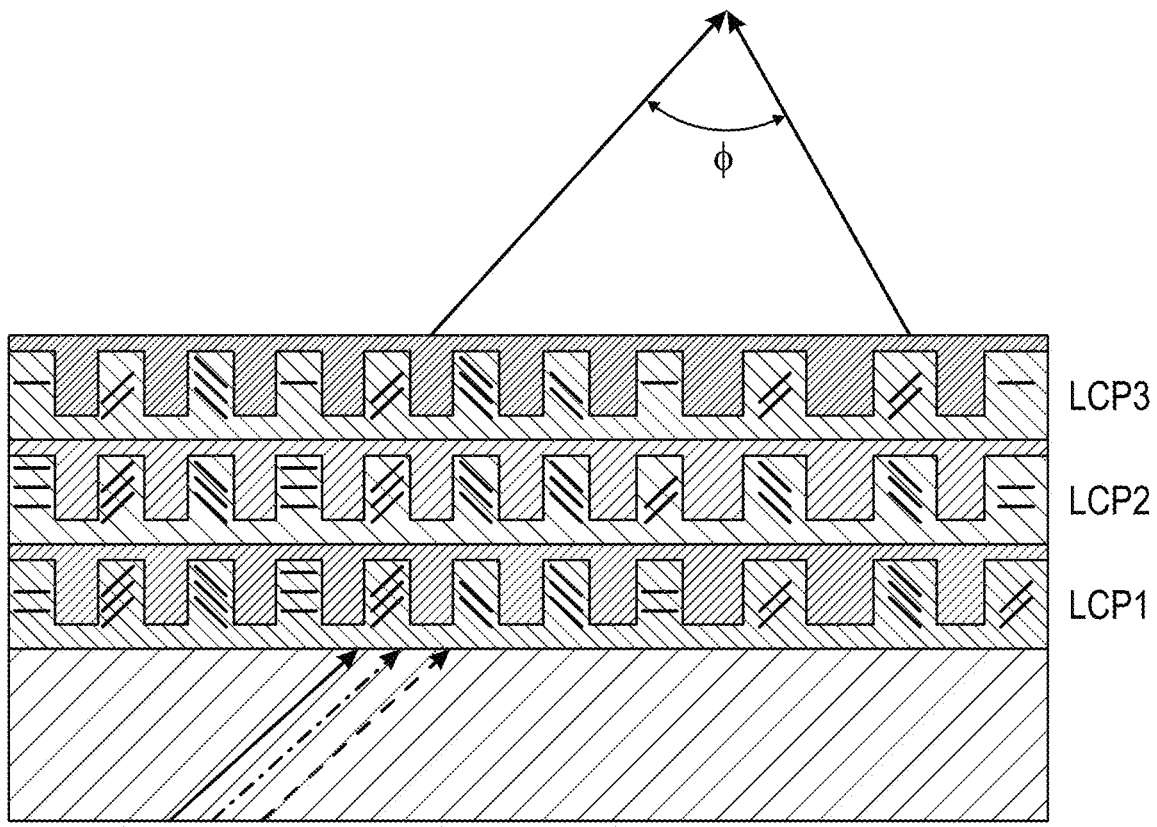

With continued reference to FIG. 9G, the first, second and third imprint patterns can each be a metasurface (e.g., PBPE structures). The first, second and third imprint patterns can be different such that each imprint pattern is configured to selectively diffract/redirect different wavelengths of light in an incident beam to couple each of the different wavelengths in one or more waveguides. In some embodiments, the different wavelengths of light in an incident beam can be coupled into the one or more waveguides at the same angle. However, in some other embodiments, as discussed below, the different wavelengths of light in an incident beam can be coupled into the one or more waveguides at different wavelengths. In some other embodiments, the PBPE structure of the first liquid crystal layer (LCP1) can serve as the alignment structure for the second liquid layer (LCP2) which in turn can serve as the alignment structure for the third liquid layer (LCP3). The embodiment illustrated in FIG. 9G can include different PBPE structures such that different wavelengths of light in an incident beam of light are diffracted or redirected at different output angles such that they are spatially separated. In various embodiments, the incident beam of light can be monochromatic or polychromatic. Conversely, the multi-layer liquid crystal structure can be used to combine different wavelengths of light as illustrated in FIG. 9H.

Figure 9I:
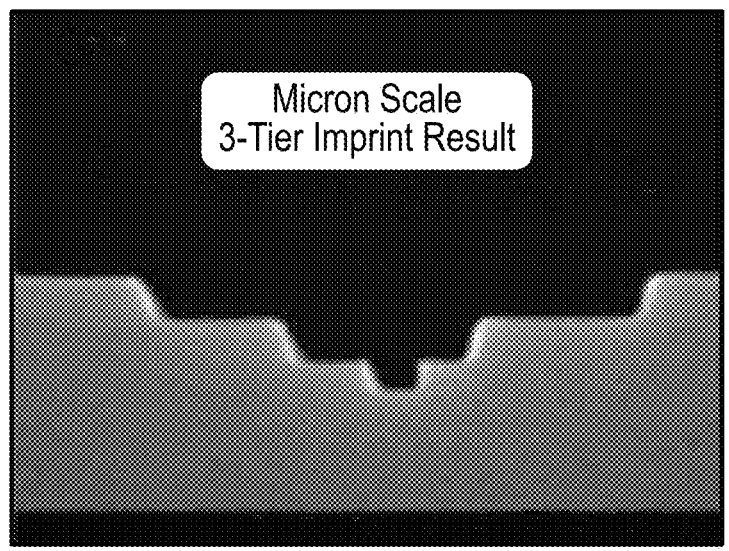
FIG. 9I illustrates an embodiment of a resist layer imprinted with a pattern as described in the method described in FIG. 9D.

FIG. 9I illustrates a cross-section of a resist layer imprinted with an imprint pattern illustrated in FIG. 9B.

As discussed above, the liquid crystal layer can be formed with a variety of materials. For example, in some embodiments, an acrylate liquid crystal formulation can be disposed over the polymer align imprint structure using inkjet and imprint technology. Acrylate composition can facilitate stacking different liquid crystal layers on top of each other that can adhere to each other without adhesive layers thereby making process simpler. Different liquid crystal layers can be stacked to achieve a desired effect, for example, the desired polarization, diffraction, steering, or dispersion effect.

Figure 9J:
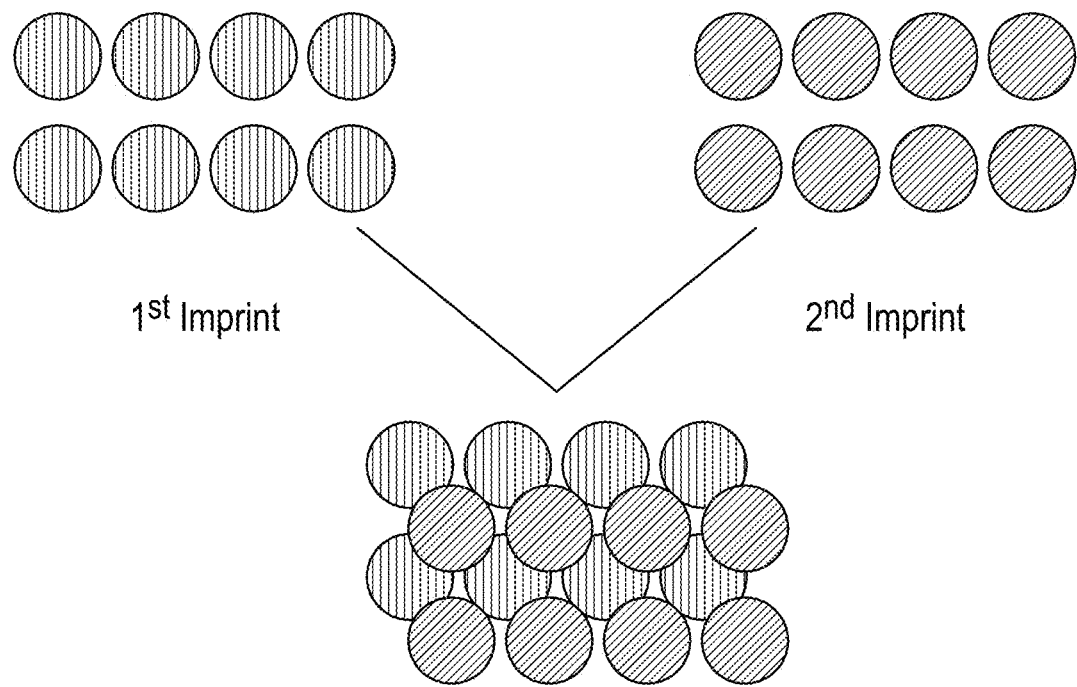
FIG. 9J illustrates a first imprint structure having discrete droplets or sections that are oriented along a first direction and a second imprint structure having discrete droplets or sections that are oriented along a second direction that can be combined to produce optical devices with complex grating patterns.

The method described above can be used to fabricate liquid crystal polarization gratings and patterned guiding layers using linear submasters with jet dispensing technology (e.g., J-FIL). Different liquid crystal grating structures can be fabricated by combining structure with different shapes, orientations, and/or pitches. This process is described in more detail with reference to FIG. 9J which illustrates a first imprint structure having discrete droplets or sections that are oriented along a first direction and a second imprint structure having discrete droplets or sections that are oriented along a second direction. The discrete droplets or sections of the first and the second imprint structures can be dispersed using inkjet technology. The discrete droplets or sections of the first and the second imprint structures can merge or not merge in different embodiments. The discrete droplets or sections in the first and the second imprint structures can be combined to produce an imprint structure with discrete droplets or sections having different orientations. Liquid crystal material can be disposed on the combined imprint pattern to produce liquid crystal gratings with molecules aligned along different orientations. The different orientations of the separate sections together can produce a more complex grating pattern, similar, for example, to that of a PBPE, in the aggregate.

Figure 9K:
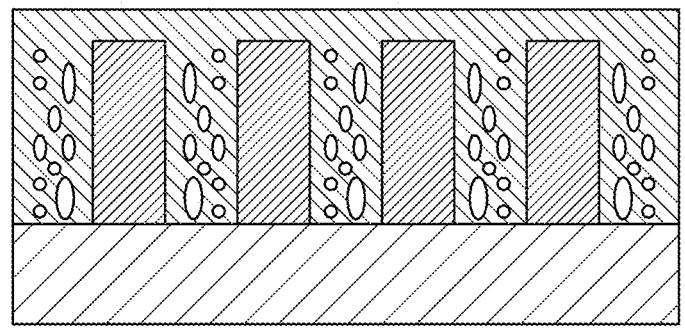
FIG. 9K and FIG. 9L illustrate different polarizer configurations that can be fabricated using the jet deposition and imprinting methods described herein.
Figure 9L:
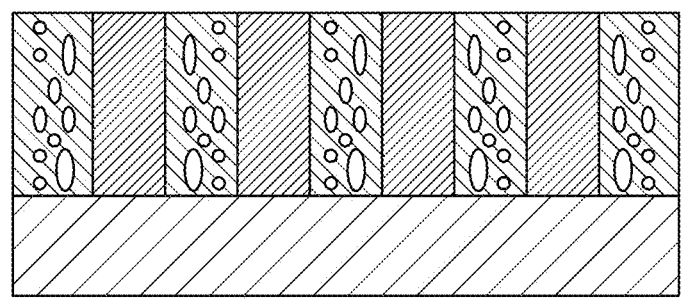

The inkjet and imprint methods discussed herein can be used to fabricate other optical elements such as waveguide plates, optical retarders, polarizers, etc. For example, a polarizer that is more transparent than existing polarizers can be fabricated using the methods described herein. The method includes disposing a transparent or substantially transparent material that is patterned such as a polymer imprint and depositing a polarizer material, such as, for example, an iodine solution containing dichroic dye. The method includes imprinting a pattern on the transparent polymer. The pattern can be linear grooves, chevrons, spirals, arcs, or any other simple or complicated pattern. For example, the pattern can be a periodic linear grating structure. The polarizer material can then be deposited on the patterned transparent polymer using the jet technology (such as, for example, J-FIL) described above, imprint planarization or by spin coating. FIGS. 9K and 9L illustrate different polarizer configurations that can be fabricated using the methods described above. The polarizers fabricated using the technology described herein can be more transparent than existing polarizers. Such a component may be useful for devices that utilize low extinction ratio polarizers such as a waveguide stack for head mounted display eyepieces for augmented and virtual reality as described elsewhere herein.

Subwavelength scale grating structures can induce birefringence in materials. For example, single dimensional grating can act as artificial negative uniaxial materials whose optical axes are parallel to the grating vector. Such birefringence can be referred to as form birefringence. Accordingly, substrates including subwavelength scale grating structures can function as wave plates. The amount of retardation provided by substrates including subwavelength scale grating structures can depend on the dimension (e.g., height, width, pitch, etc.) of the grating patterns as well as the material refractive index. For example, a material with higher index comprising a pattern of subwavelength scale features can provide higher retardation than a material with lower index comprising a similar pattern of subwavelength scale features. Inkjet and imprint technology, such as, for example, J-FIL allows high throughput Ultra Violet Nano-Imprint Lithography (UV-NIL) patterning capabilities with very low waste of material over any defined area. Inkjet and imprint technology, such as, for example, J-FIL can also facilitate repeated stacking of imprinted layers. Imprint layers (single or multi-layered) with such subwavelength scale grating structures with or without varying geometry/orientation can provide varying degrees of phase-shift. Embodiments of patterned birefringent materials can enhance thin film integration capabilities in various optical applications.

Figure 9M:
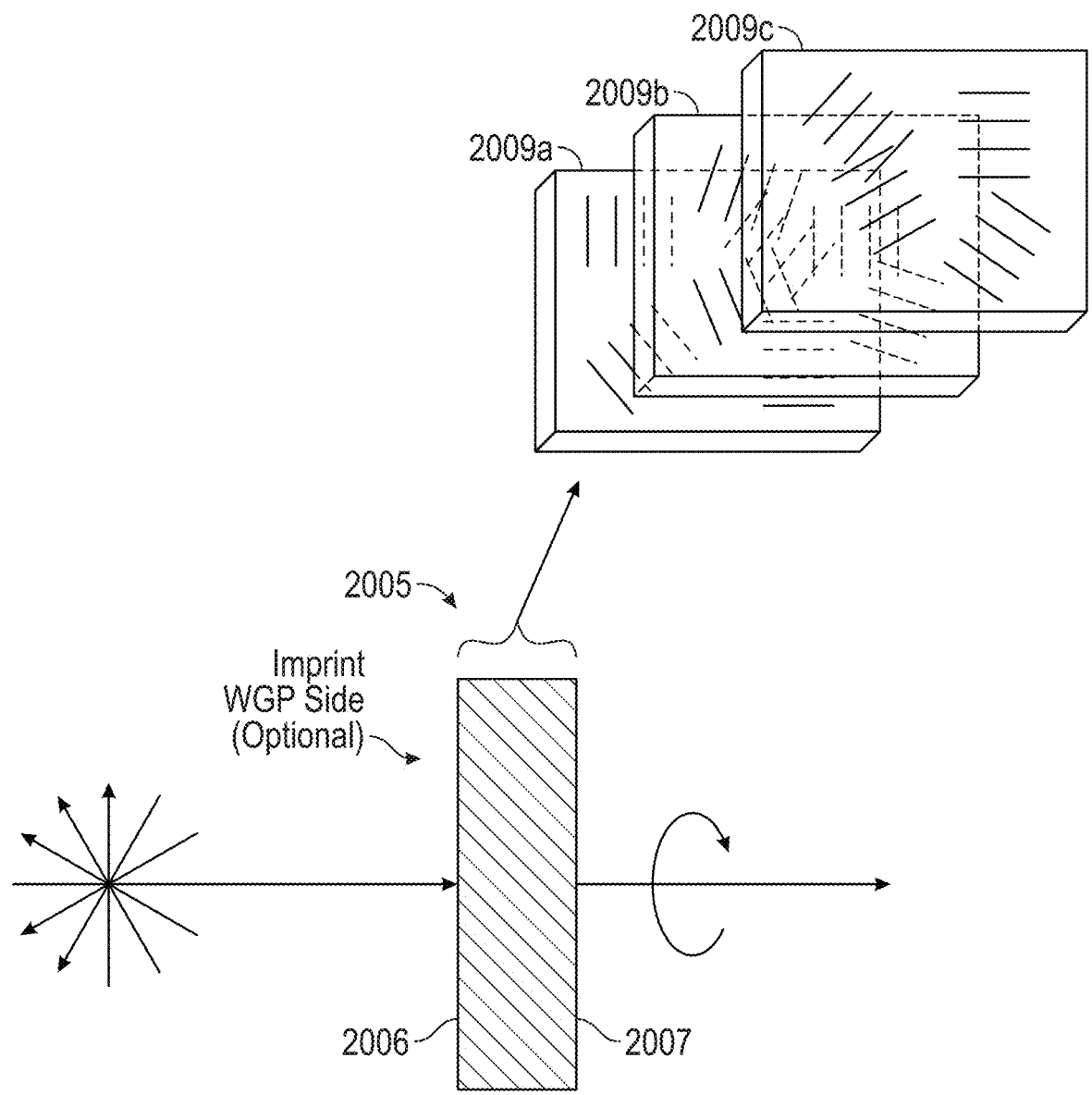
FIG. 9M illustrates an embodiment of a waveguide plate having a light entrance surface and a light exit surface that can change the polarization state of incident light.

The polarization of light output from substrates including subwavelength scale grating structures can depend on the orientation, shape and/or pitch of the subwavelength scale grating structures. Embodiments of wave plates including subwavelength scale grating structures can also be fabricated using the inkjet and imprint methods described herein. FIG. 9M illustrates an embodiment of a waveguide plate 2005 having a light entrance surface 2006 and a light exit surface 2007. The waveguide plate 2005 can include a plurality of subwavelength scale grating features with varying shapes, orientations and/or pitches such that incident unpolarized light is output as a polarized light. In various embodiments, the wave plate 2005 can include multiple stacks of thin transparent films 2009a, 2009b and 2009c that are imprinted with subwavelength scale grating features with varying shapes, orientations and/or pitches. The grating features can be imprinted on the transparent films using an imprint template as shown in FIG. 9C. In various embodiments, the transparent films 2009a, 2009b and 2009c can comprise imprintable resists having refractive index between about 1.45 and 1.75. The polarization of the light output from a multilayer structure can depend on the shapes, orientations and/or pitches of the grating structures as well as refractive index difference between the different layers. For the embodiment illustrated in FIG. 9M, incident unpolarized light is converted to right circularly polarized light by the waveguide plate 2005. In other embodiments, the waveguide plate can be configured to provide linearly polarized light, left circularly polarized light or light with any other polarization characteristic.

It is contemplated that the innovative aspects may be implemented in or associated with a variety of applications such as imaging systems and devices, display systems and devices, spatial light modulators, liquid crystal based devices, polarizers, wave guide plates, etc. The structures, devices and methods described herein may particularly find use in displays such as wearable displays (e.g., head mounted displays) that can be used for augmented and/or virtually reality. More generally, the described embodiments may be implemented in any device, apparatus, or system that can be configured to display an image, whether in motion (such as video) or stationary (such as still images), and whether textual, graphical or pictorial. It is contemplated, however, that the described embodiments may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, head mounted displays and a variety of imaging systems. Thus, the teachings are not intended to be limited to the embodiments depicted solely in the Figures, but instead have wide applicability as will be readily apparent to one having ordinary skill in the art.

Various modifications to the embodiments described in this disclosure may be readily apparent to those skilled in the art, and the generic principles defined herein may be applied to other embodiments without departing from the spirit or scope of this disclosure. Thus, the claims are not intended to be limited to the embodiments shown herein, but are to be accorded the widest scope consistent with this disclosure, the principles and the novel features disclosed herein. The word "exemplary" is used exclusively herein to mean "serving as an example, instance, or illustration." Any embodiment described herein as "exemplary" is not necessarily to be construed as preferred or advantageous over other embodiments. Additionally, a person having ordinary skill in the art will readily appreciate, the terms "upper" and "lower", "above" and "below", etc., are sometimes used for ease of describing the figures, and indicate relative positions corresponding to the orientation of the figure on a properly oriented page, and may not reflect the proper orientation of the structures described herein, as those structures are implemented.

Certain features that are described in this specification in the context of separate embodiments also can be implemented in combination in a single embodiment. Conversely, various features that are described in the context of a single embodiment also can be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Additionally, other embodiments are within the scope of the following claims. In some cases, the actions recited in the claims can be performed in a different order and still achieve desirable results.

Various example embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Example aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

What is claimed is:

1. A method of manufacturing a waveguide structure, the method comprising:
    forming a liquid crystal in-coupling optical element, wherein forming the liquid crystal in-coupling optical element comprises:
        depositing a resist material on a waveguide substrate;
        imprinting a pattern on the resist material using an imprint template, wherein the imprint template comprises an imprint pattern with multi-tier geometry;
        jet depositing a layer of liquid crystal material on the patterned resist material such that molecules of the liquid crystal material are self-aligned to the pattern; and
        immobilizing the molecules of the liquid crystal material by subjecting the liquid crystal material to an immobilization process.

2. The method of claim 1, wherein depositing the resist material includes jet depositing the resist material.

3. The method of claim 1, wherein the imprint template includes surface relief features.

4. The method of claim 1, wherein the imprint template includes features having a size between about 10 nm and about 200 nm.

5. The method of claim 1, wherein the imprint template includes features having a size between about 20 nm and about 1 micron.

6. The method of claim 1, wherein the imprint template includes PBPE structures.

7. The method of claim 1, wherein the liquid crystal device includes a metasurface.

8. The method of claim 1, wherein the liquid crystal device comprises a metamaterial.

9. The method of claim 1, wherein the imprint template includes a grating array.

10. The method of claim 1, wherein the imprint template includes curvilinear grooves or arcs.

11. The method of claim 1, further comprising depositing an additional layer of liquid crystal material over the layer of liquid crystal material.

12. The method of claim 11, wherein the additional layer of liquid crystal material is self-aligned to the pattern.

13. The method of claim 11, wherein a pattern is imprinted on the additional layer of liquid crystal material.

14. The method of claim 13, wherein the pattern imprinted on the additional layer of liquid crystal material is different from the pattern imprinted on the resist material.

15. The method of claim 13, wherein the layer of liquid crystal material aligned to the pattern imprinted on the resist material is configured to act on a first wavelength, and the pattern imprinted on the additional layer of liquid crystal material is configured to act on a second wavelength.

16. The method of claim 1, wherein the imprint pattern comprises three tiers.

17. The method of claim 1, wherein depositing the resist material on the substrate comprises jet depositing a plurality of discrete droplets of the resist material.

18. The method of claim 1, wherein the immobilization process comprises curing.

19. The method of claim 18, wherein the curing comprises UV curing, thermal curing, or freezing.

* * * * *